(12) United States Patent
Asahara et al.

(10) Patent No.: US 10,538,179 B2
(45) Date of Patent: Jan. 21, 2020

(54) WORK VEHICLE

(71) Applicant: Kubota Corporation, Osaka (JP)

(72) Inventors: Masato Asahara, Sakai (JP); Ryotaro Senda, Sakai (JP); Seiya Yoshida, Sakai (JP); Hideki Aoki, Sakai (JP); Kensuke Uemoto, Sakai (JP); Yoshikazu Togoshi, Sakai (JP); Yuto Fujii, Sakai (JP)

(73) Assignee: Kubota Corporation, Osaka (JP)

( * ) Notice: Subject to any disclaimer, the term of this patent is extended or adjusted under 35 U.S.C. 154(b) by 269 days.

(21) Appl. No.: 15/361,674

(22) Filed: Nov. 28, 2016

(65) Prior Publication Data

US 2017/0166044 A1   Jun. 15, 2017

(30) Foreign Application Priority Data

Dec. 11, 2015  (JP) ................................. 2015-242222
Dec. 24, 2015  (JP) ................................. 2015-252593
Feb. 10, 2016  (JP) ................................. 2016-023757

(51) Int. Cl.
*B62D 37/04* (2006.01)
*B60N 2/38* (2006.01)
*F02M 37/00* (2006.01)
*F02M 37/04* (2006.01)

(52) U.S. Cl.
CPC ............... *B60N 2/38* (2013.01); *B62D 37/04* (2013.01); *F02M 37/007* (2013.01); *F02M 37/0017* (2013.01); *F02M 37/0023* (2013.01); *F02M 37/0088* (2013.01); *F02M 37/04* (2013.01)

(58) Field of Classification Search
CPC ................................................. B60Y 2200/223
USPC .................................................. 280/755, 759
See application file for complete search history.

(56) References Cited

U.S. PATENT DOCUMENTS

| 3,135,404 | A | * | 6/1964 | Pilch | B62D 49/085 |
| | | | | | 212/178 |
| 3,492,019 | A | * | 1/1970 | Folkerts | B62D 49/0628 |
| | | | | | 280/759 |
| 4,232,883 | A | * | 11/1980 | Bourgeous | B62D 49/085 |
| | | | | | 280/759 |
| 6,035,941 | A | * | 3/2000 | Hirooka | B62D 49/02 |
| | | | | | 172/273 |

(Continued)

FOREIGN PATENT DOCUMENTS

JP        60155649 U     10/1985
JP        0414982 Y       1/1986
(Continued)

*Primary Examiner* — Tony H Winner
(74) *Attorney, Agent, or Firm* — The Webb Law Firm

(57) ABSTRACT

A mower may include a body frame, a mower unit installed to the body frame, a grass collection container optionally installed at a rear portion of the body frame, a front-wheel support arm provided at a front portion of the body frame, a left front wheel and a right front wheel supported by the front-wheel support arm, a counterweight, and a weight bracket. The weight bracket may be provided on the front-wheel support arm and configured to attach the counterweight thereto. The counterweight may include a plurality of weight elements. The weight bracket may include a plurality of attachment portions. The at least one weight element may be attached to each attachment portion.

7 Claims, 14 Drawing Sheets

(56) References Cited

U.S. PATENT DOCUMENTS

| | | | |
|---|---|---|---|
| 8,430,427 B1* | 4/2013 | Gaeddert | B62D 49/085 |
| | | | 212/195 |
| 8,662,460 B2* | 3/2014 | Heimbuch | B62D 49/085 |
| | | | 212/178 |
| 9,150,171 B2 | 10/2015 | Kim et al. | |
| 9,555,843 B2* | 1/2017 | Fujimoto | B62D 49/0628 |
| 2003/0010008 A1 | 1/2003 | Atterbury et al. | |
| 2012/0323420 A1 | 12/2012 | Koike et al. | |
| 2015/0039171 A1 | 2/2015 | Koike et al. | |

FOREIGN PATENT DOCUMENTS

| | | |
|---|---|---|
| JP | 6264203 U | 4/1987 |
| JP | 63036355 U | 3/1988 |
| JP | 449517 U | 4/1992 |
| JP | 04117541 U | 10/1992 |
| JP | 939850 A | 2/1997 |
| JP | 971140 A | 3/1997 |
| JP | 09245550 A | 9/1997 |
| JP | 2563729 Y2 | 11/1997 |
| JP | 2005178490 A | 7/2005 |
| JP | 2006273127 A | 10/2006 |
| JP | 20086981 A | 1/2008 |
| JP | 200818913 A | 1/2008 |
| JP | 200899638 A | 5/2008 |
| JP | 201271795 A | 4/2012 |
| JP | 20131230 A | 1/2013 |
| JP | 2013216162 A | 10/2013 |
| JP | 2014104933 A | 6/2014 |
| JP | 2015186998 A | 10/2015 |

* cited by examiner

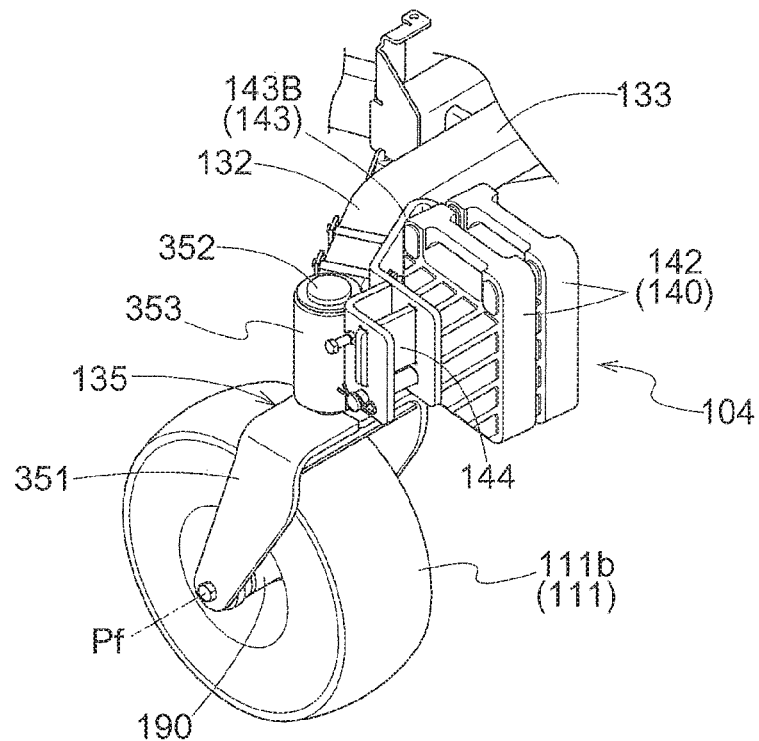
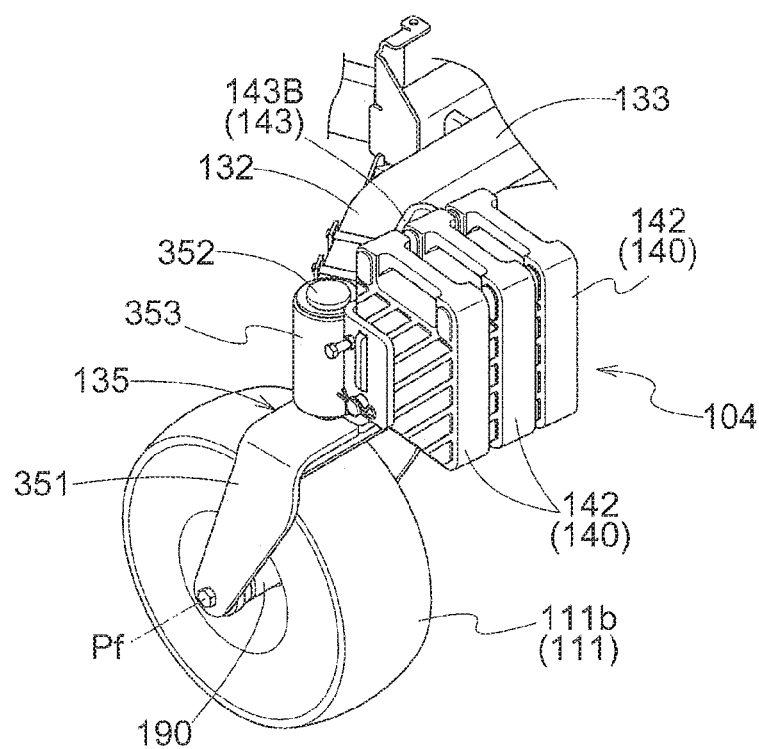

WORK VEHICLE

CROSS-REFERENCE TO RELATED APPLICATIONS

This application claims priority to Japanese Patent Application Nos. 2015-242222, 2015-252593, and 2016-023757, filed Dec. 11, 2015, Dec. 24, 2015, and Feb. 10, 2016, respectively, the disclosures of which are hereby incorporated in their entirety by reference.

BACKGROUND OF THE INVENTION

Field of the Invention

The present invention relates to a work vehicle such as a mower.

Description of Related Art (1) First Related Art

A certain kind of work vehicle mounts an engine that has its fuel supplied from a plurality of fuel tanks (for example, see JP 2563729 Y). In a fuel tank system in an agricultural tractor disclosed in JP 2563729 Y, upper portions of a right side fuel tank and a left side fuel tank are in communication with each other through an air circulation pipe, and bottom portions of the right side fuel tank and the left side fuel tank are connected to each other through a fuel withdrawal pipe, and a pump suction pipe is branched from the center of the fuel withdrawal pipe. A fuel pump is provided in the pump suction pipe, and fuel can be supplied from the fuel supply pump to the engine.

When a plurality of fuel tanks are installed, in consideration of weight balance in the work vehicle, it is desired to reduce the remaining fuel in each fuel tank in a similar manner. In order to accomplish this, it is possible to adopt a configuration in which, for example, a fuel switching cock or the like is provided, and by selecting the fuel tank to be used as necessary, the remaining fuel in each tank is caused to be as equal as possible. However, operation of the fuel switching cock as necessary places a burden on a vehicle operator. Therefore, technology is desired in which a fuel system is constructed such that, even when omitting the fuel switching cock, by keeping an equivalent internal pressure within each fuel tank, fuel can be supplied equivalently from a plurality of fuel tanks to the engine, and so the remaining fuel in the plurality of fuel tanks is caused to be as equal as possible.

(2) Second Related Art

Among riding mowers that are an example of a work vehicle, there is a riding mower in which a mower unit is installed to a body frame, and a grass collection container that stores grass mown and collected by the mower unit can be attached to the body frame (for example, see JP 2012-071795 A).

In the mower according to JP 2012-071795 A, an engine is installed in a rear portion of the body frame, the grass collection container is connected to a rear end of the body frame, and the mower unit is suspended from the body frame between front wheels and rear wheels. A rear weight installation means for installing a weight is provided at the rear end of the body frame, and a front weight installation means for installing a weight is provided at a front end of the body frame. The front wheels are supported at both ends of a front-wheel support arm positioned rearward of the front weight installation means. In this mower, when connecting the grass collection container to the body frame in the rear portion, a weight is removed from the rear weight installation means, and switched to the front weight installation means. Thus, although the weight on the rear portion of the vehicle body increases by the weight of the grass collection container, front-rear weight balance of the vehicle can be attained, so that an appropriate ground load is placed on the front wheels, and a caster function of the front wheels is well-maintained.

However, because selective connection of grass collection containers having different weights to the body frame is not considered, in a case of switching from a light grass collection container to a heavy grass collection container, it is necessary to switch the weight installed to the front weight installation means to another weight that is heavier. Conversely, when switching from a heavy grass collection container to a light grass collection container, it is necessary to switch the weight installed to the front weight installation means to another weight that is lighter.

Further, in the mower according to JP 2012-071795 A, the front weight installation means where a weight is installed is provided at the front end of the body frame, so that it is necessary to avoid interfering with the front-wheel support arm that is likewise installed near the front end of the body frame. Therefore, the front weight installation means is provided at a position separated frontward from the front-wheel support arm, and as a result, the total length of the vehicle body increases, which is inconvenient.

In consideration of the above-described circumstances, improvements related to attachment of a counterweight necessary when selectively installing a different grass collection container are desired.

(3) Third Related Art

Among work vehicles in which an operator seat is provided, there is a riding electric mower in which a mower unit is provided in the vehicle body (for example, see JP 2013-001230 A, or US 2012/0323420 A1 and US 2015/039171 A1 (divisional application of US 2012/0323420 A1) corresponding to JP 2013-001230 A). Specifically, as shown in FIG. 3 thereof, the riding electric mower includes a vehicle body supported by the front wheels and the rear wheels, an operator seat disposed in the vehicle body, and a mower unit suspended from the vehicle body. Also, in fenders on both sides of the operator seat, there are disposed left-right operation levers, and an electric operation panel having switch buttons, switch levers, and the like.

Also, among the above sort of work vehicles, there is a work vehicle in which a cigar socket (cigar lighter) is disposed in a ceiling plate portion of left-right fenders (for example, see FIG. 16 of JP 2015/0186998 A).

As described above, conventionally, an electrical connection port for withdrawing electrical power or an electrical signal of the cigar socket is provided in a fender. However, because the operation levers, the operation panel, and the like are already disposed in the fender, space for disposing the electrical connection port is restricted. Therefore, it is difficult to dispose the electrical connection port at a desired location in consideration of user convenience and the like.

In consideration of such circumstances, a work vehicle is desired in which restriction of the space for disposing the electrical connection port is reduced, so that that the location for disposing the electrical connection port can be freely set.

SUMMARY OF THE INVENTION (1) The following configuration is proposed correspondingly to the First Related Art.

A work vehicle comprising:

an engine;

a first fuel tank;

a second fuel tank;

a fuel supply path including a first fuel supply path extending from the first fuel tank, a second fuel supply path extending from the second fuel tank, a merging portion that merges fuel from the first fuel supply path with fuel from the second fuel supply path, and a common supply path connecting the merging portion to the engine;

a fuel pump provided in the common supply path and configured to supply fuel from the merging portion to the engine;

a first check valve interposed on the first fuel supply path, and configured to open according to a differential pressure between pressure on the side of the fuel tank of the first fuel supply path and pressure on the side of the merging portion of the first fuel supply path;

a second check valve interposed on the second fuel supply path, and configured to open according to a differential pressure between pressure on the side of the fuel tank of the second fuel supply path and pressure on the side of the merging portion of the second fuel supply path; and a communication channel that establishes communication between an upper space of the first fuel tank and an upper space of the second fuel tank.

According to this configuration, in order to supply fuel to the diesel engine, fuel is sucked out from the first fuel tank and the second fuel tank by a common fuel pump through a check valve. When doing so, because the check valve is intervening in the fuel supply path, if there is a pressure differential between the first fuel tank and the second fuel tank due to different amounts of stored fuel, more fuel is sucked out from the fuel tank having a larger pressure, i.e., the tank having a larger amount of stored fuel. Accordingly, it is important that a difference between the supply pressure of the first fuel tank and the supply pressure of the second fuel tank is caused by a difference in the amount of fuel stored in each fuel tank. For example, when a difference in tank internal pressure occurs due to variation in precision of a fuel cap that closes a refueling port of a refueling portion, it is possible that fuel will be sucked out from only one fuel tank. This sort of problem is solved by the respective internal pressures being brought into equilibrium by a communication channel in communication with an upper space of the first fuel tank and an upper space of the second fuel tank. Thus, a difference between the amount of fuel stored in the first fuel tank and the amount of fuel stored in the second fuel tank can be avoided.

It is necessary for the communication channel to open into a space above the fuel liquid face, and the location satisfying this condition is near the refueling portion where the refueling port is formed. Therefore, it is convenient that one end of the communication channel opens at a position adjacent to a refueling portion of the first fuel tank, and the other end of the communication channel opens at a position adjacent to a refueling portion of the second fuel tank.

Fuel has weight, so that in order for the first fuel tank and the second fuel tank to not adversely affect the weight balance of the vehicle, it is preferable that fuel is disposed divided between the right side and the left side of the vehicle. When doing so, it is preferable to dispose the communication channel at a location where the communication channel interferes little with other members, and where the communication channel will not become a nuisance for movement of an operator or the like, or installation of other devices. Therefore, in a preferable embodiment of the present invention, the first fuel tank and the second fuel tank are arranged separate from each other across the operator seat in a transverse direction of the vehicle, and the communication channel passes behind the operator seat. Also, from the viewpoint of protecting the communication channel, it is preferable that the communication channel is formed with a rubber hose, and a metal pipe of steel tubing or the like encloses the rubber hose.

In a case where the engine is a diesel engine, it is necessary that some of the fuel that has been supplied by the fuel pump is returned to the fuel tank, so that a fuel return path is provided that is in communication between the diesel engine and the first fuel tank and the second fuel tank, the fuel return path returning extra fuel from the diesel engine to the first fuel tank and the second fuel tank.

When doing so, in order to not cause a large difference between the amount of fuel stored (the amount of fuel remaining) in the first fuel tank and the amount of fuel stored in the second fuel tank, it is desirable to return an equal amount of fuel from the diesel engine to the first fuel tank and the second fuel tank, to the extent possible. Therefore, preferably, the fuel return path includes a common return path extending from the diesel engine, a branching portion provided in the common return path, a first fuel return path extending from the branching portion to the first fuel tank, and a second fuel return path extending from the branching portion to the second fuel tank, a first return port of the first fuel return path being formed in the first fuel tank, a second return port of the second fuel return path being formed in the second fuel tank, and a height level of the first return port in the first fuel tank and a height level of the second return port in the second fuel tank being set to the same height level (also including approximately the same height level).

In this configuration, fuel that has returned from the diesel engine is branched at the branching portion, and respective branched fuel returns to the first fuel tank and the second fuel tank. Consequently, the amount of fuel stored in each fuel tank increases, and a circumstance is avoided in which, for example in a state where a return port is plugged, the pressure in that fuel return path increases, so that the fuel that has been returned from the diesel engine flows into the other fuel tank, and only one fuel tank becomes full. In this embodiment, both return ports are located at approximately the same height level; this means a height level guaranteeing to avoid a circumstance in which only one fuel tank becomes full.

In order for the ratio of fuel that is returned from the diesel engine to the first fuel tank and the second fuel tank to be as equal as possible, it is preferable that fuel flow resistance is substantially the same in the first fuel return path and the second fuel return path. For example, the difference between the first fuel return path and the second fuel return path is preferably within 0% to 20%. As one preferable measure for achieving this, the first fuel return path and the second fuel return path are configured with substantially the same flow cross-sectional area and channel length. For example, the difference in the flow cross-sectional area, and the difference in the channel length, between the first fuel return path and the second fuel return path are preferably within 0% to 20%.

Also, in an advantageous configuration, a bottom face of the first fuel tank and a bottom face of the second fuel tank are positioned above a crankshaft of the diesel engine, the first fuel supply path is connected to the bottom face of the first fuel tank, the second fuel supply path is connected to the bottom face of the second fuel tank, and the fuel return path is connected to an upper face of the first fuel tank and an upper face of the second fuel tank.

(2) The following configuration is proposed correspondingly to the Second Related Art.

A mower, comprising:
a body frame;
a mower unit installed to the body frame;
a grass collection container capable of being selectively installed to a rear portion of the body frame;
a front-wheel support arm provided in a front portion of the body frame;
a left front wheel and a right front wheel supported by the front-wheel support arm;
a counterweight; and
a weight bracket provided in the front-wheel support arm and configured such that the counterweight can be attached to the weight bracket;
wherein the counterweight includes a plurality of weight elements,
the weight bracket includes a plurality of attachment portions, and
at least one weight element can be attached to each attachment portion.

In this configuration, a front-wheel support arm is provided in a front portion of the body frame, and a weight bracket is provided in the front-wheel support arm. A plurality of attachment portions where a weight element can be attached are provided in the weight bracket. For example, when a light grass collection container is to be attached, one or a small quantity of weight elements are attached to each attachment portion, and when a heavy grass collection container is to be attached, a plurality of weight elements are attached to each attachment portion. Therefore, it is preferable that a quantity of weight elements necessary for a heavy grass collection container are prepared, and when a light grass collection container is to be attached or when a grass collection container is not attached, the necessary quantity of weight elements are attached, or none of the weight elements are attached.

Further, the weight bracket is provided in the front-wheel support arm, so that as a result, weight elements are provided in the front-wheel support arm. Therefore, when attaching the front-wheel support arm to the body frame, it is not necessary to consider interference between the front-wheel support arm and the weight bracket and the weight element. Therefore, a problem of the body frame becoming longer than necessary is eliminated.

As the distance between the front wheels and the rear wheels (the wheelbase) increases, straight-line stability improves, but because the body frame becomes longer, the vehicle body becomes heavier. Also, in a case where the mower unit is disposed between the front wheels and the rear wheels, it is more convenient to have a longer wheelbase. Therefore, in a preferable embodiment of the present invention, the front-wheel support arm is bow-shaped, having a left bent portion bent forward in a left end area of the front-wheel support arm, and having a right bent portion bent forward in a right end area of the front-wheel support arm, the left front wheel is attached to a tip portion of the left bent portion, the right front wheel is attached to a tip portion of the right bent portion, and the weight bracket is fixed to each of the left bent portion and the right bent portion. With this configuration, even when the wheelbase is increased, lengthening of the entire length of the body frame can be suppressed. Further, in this configuration, the front-wheel support arm and the front wheels protrude forward from the front end of the body frame. Therefore, even when adopting a rolling structure whereby the front-wheel support arm is connected to the body frame through a rolling shaft, a sufficient gap is obtained between the front-wheel support arm and the front wheels, and the body frame and other members, when rolling occurs.

When using caster wheels for the front wheels, the front wheels are positioned to the rear of the support position where the front wheels are supported by the front wheels support frame, so that the space between the front wheels and other members is small. As a preferable embodiment for adequately securing that space, it is proposed that the left front wheel is attached to the tip portion of the left bent portion so as to be capable of turning around a vertical axis through a caster bracket, and the right front wheel is attached to the tip portion of the right bent portion so as to be capable of turning around a vertical axis through a caster bracket.

In a simple configuration for changing the weight of the counterweight according to the type of grass collection container, fixed to the front-wheel support arm, a plurality of attachment portions are formed such that an arbitrary quantity of weight elements can be attached to the weight bracket. When doing so, it is preferable that the attachment portions are lined up laterally such that other weight elements do not become a nuisance when removing a weight element. Therefore, in one preferable embodiment of the present invention, by providing the plurality of attachment portions in the weight bracket in a line in the transverse direction of the vehicle, the plurality of weight elements can be attached to the weight bracket in a line in the transverse direction of the vehicle.

Also, in an advantageous configuration, the weight element attached to the weight bracket is positioned above the left front wheel or the right front wheel, and forward of an axle passing through the corresponding front wheel. According to this sort of configuration, there is a low possibility of the weight element becoming a nuisance to travel or work.

Also, in an advantageous configuration, a rolling shaft extends through the body frame in the front-rear direction of the vehicle, and the front-wheel support arm is connected to a front end of the body frame by the rolling shaft to be rolled around the rolling shaft relative to the body frame.

In one preferable embodiment of the present invention, corner pole units for checking the width of the mower unit and/or the width of mowing by the mower unit are provided in the area of both ends of the front-wheel support arm. With these corner pole units, it is easy for the operator to check the width of the mower unit or the width of mowing. Also, because these corner pole units are provided in the front-wheel support arm where they enter even the comparatively narrow field of view of the operator when looking forward, the range of movement of the operator's viewpoint in order to check the width of the mower unit or the width of mowing is reduced, and so stable mowing travel operation can be anticipated.

(3) The following configuration is proposed correspondingly to the Third Related Art.

A work vehicle, comprising:
an operator seat;
wherein an electrical connection port configured to externally output at least one of electrical power and an electrical signal is provided in the operator seat.

According to this configuration, the electrical connection port is provided in the operator seat, so that in comparison to a conventional configuration in which various operation levers have already been disposed in the fenders, it is possible to reduce restriction of the space for disposing the electrical connection port, so that the location for disposing the electrical connection port can be freely set.

In the above configuration, it is preferable that a cover configured to cover the electrical connection port is provided.

Particularly in a work vehicle that does not have a cabin, in order to prevent poor or degraded connections due to penetration of rain water, dust, or the like, it is preferable that the electrical connection port has a waterproof/dustproof function. According to this configuration, the electrical connection port is covered by a cover, so that it is difficult for rain water, dust, or the like to enter, and the electrical connection port is protected from sun exposure, so that the electrical connection port has excellent durability. Further, because the cover is provided and the electrical connection port can be used outside, this configuration can also be easily utilized in a work vehicle that is not provided with a cabin, a sunshade cover, or the like.

Also, in the above configuration, it is preferable that the operator seat includes a backrest portion and a seat portion, and the electrical connection port is provided in a thick portion in a side portion of the backrest portion. According to this configuration, the electrical connection port is provided in a thick portion in a side portion of the backrest portion, so that the electrical connection port does not become a nuisance to the operator when the operator is sitting in the operator seat, and the operator can easily use the electrical connection port while sitting.

Also, in the above configuration, it is preferable that the operator seat includes a backrest portion and a seat portion, and the electrical connection port is provided in a thick portion in a side portion of the seat portion. According to this configuration, the electrical connection port is provided in a thick portion in a side portion of the seat portion, so that the electrical connection port does not become a nuisance to the operator when the operator is sitting in the operator seat, and the operator can easily use the electrical connection port while sitting.

Also, in the above configuration, it is preferable that the electrical connection port is at least any one among an AUX port (auxiliary port) configured for audio input/output, a cigar socket configured for charging, and a USB port (universal serial bus port) configured for insertion of a USB cable. According to this configuration, using the electrical connection port, an operator can easily connect an external device to listen to audio, charge the external device, or the like.

Other features and advantages resulting from such features will become apparent by reading the description below.

BRIEF DESCRIPTION OF THE DRAWINGS

FIG. 11 is a perspective view showing a state in which weight elements are attached to the weight bracket;

FIG. 12 is a perspective view showing a state in which weight elements are attached to the weight bracket;

DETAILED DESCRIPTION OF PREFERRED EMBODIMENTS

Figure 1:
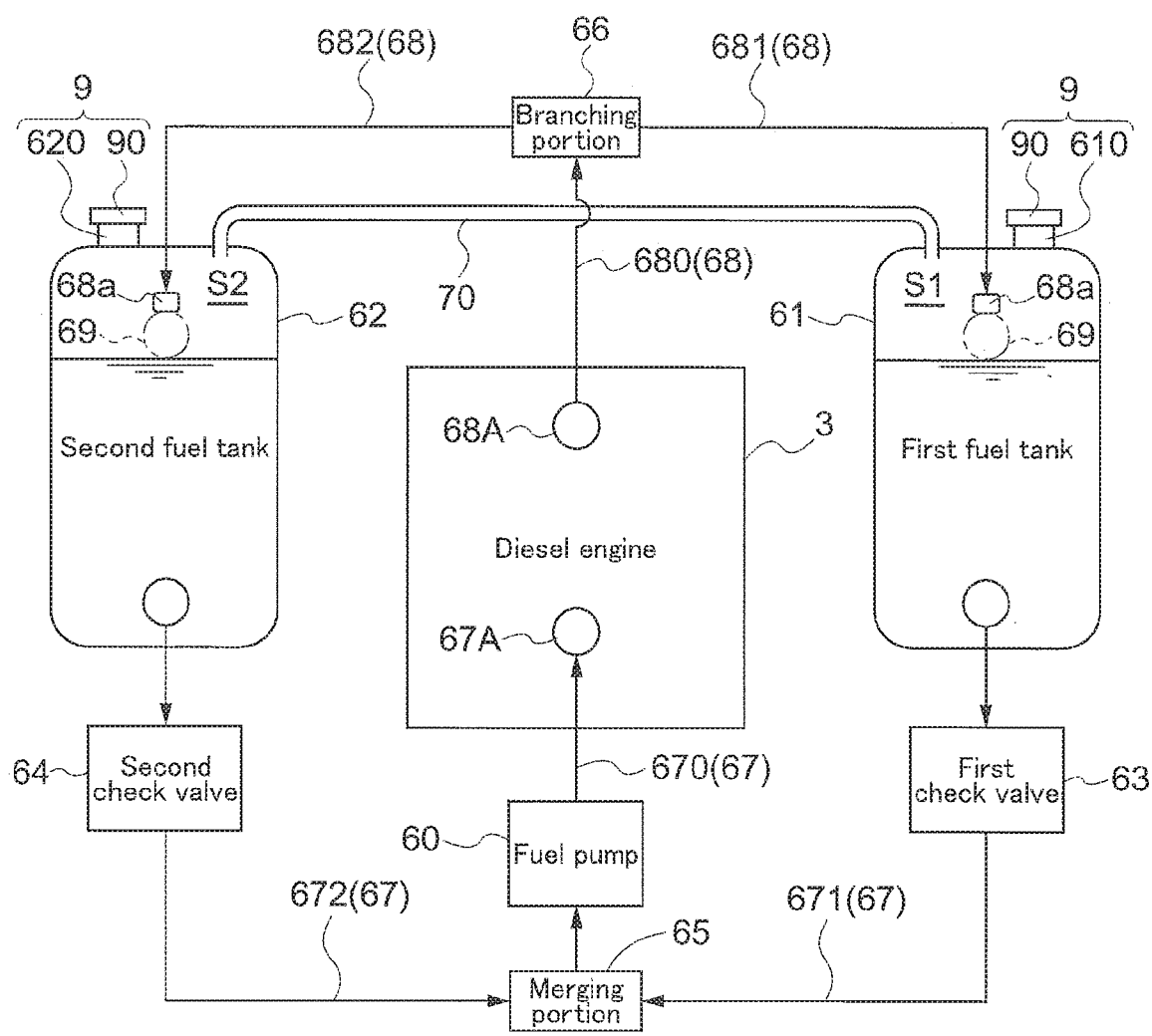
FIG. 1 shows a first embodiment (same through to FIG. 4), and is a schematic view illustrating basic principles of fuel circulation.

In the following description, unless explicated otherwise, the front-rear direction of the vehicle is the direction of the vehicle center axis (also referred to as the vehicle longitudinal axis) that extends in the horizontal direction along the travel direction of the vehicle, and the vehicle transverse direction (also referred to as simply the lateral direction) is the direction that extends in the horizontal direction orthogonal to the vehicle center axis. 'Front (forward)' means the forward travel side in the front-rear direction of the vehicle, and 'rear (rearward)' means the rearward travel side in the front-rear direction of the vehicle. 'Left (left side)' means left when pointing toward the direction of forward travel of the vehicle, and 'right (right side)' means right when pointing toward the direction of forward travel of the vehicle. Above (top side) and below (bottom side) indicate the positional relationship in the vertical direction (height direction) of the vehicle.

First Embodiment

Basic Configuration of Fuel Circulation

Before describing a specific embodiment of a work vehicle according to the present invention, the specific configuration of fuel circulation between fuel tanks and an engine adopted in the present invention will be described with reference to FIG. 1. An engine 3 installed in this work vehicle receives fuel supply from a left-right pair of a first fuel tank 61 and a second fuel tank 62. The first fuel tank 61 and the second fuel tank 62 have shapes that are substantially approximately the same, but the fuel tanks are not required to have the same shape. The first fuel tank 61 and the second fuel tank 62 are connected to a fuel supply port 67A of the engine 3 by a fuel supply path 67 that is typically configured with a fuel hose. The fuel supply path 67 includes a first fuel supply path 671 that connects the first fuel tank 61 to a merging portion 65, a second fuel supply path 672 that connects the second fuel tank 62 to the merging portion 65, and a common supply path 670 that connects the merging portion 65 to the fuel supply port 67A of the engine 3. A first check valve 63 is interposed on the first fuel supply path 671, and a second check valve 64 is interposed on the second fuel supply path 672. A fuel pump 60 is interposed on the common supply path 670. Each of the first check valve 63 and the second check valve 64 opens according to differential pressure (pressure difference) between the pressure on a fuel tank side associated therewith and the pressure on the merging portion side. That is, when negative pressure occurs in the merging portion 65 due to driving of the fuel pump 60, for example, the first check valve 63 and the second check valve 64 will open, and so an amount of fuel will flow into the common supply path 670 from the first fuel tank 61 and the second fuel tank 62.

When the fuel pump 60 drives, due to suction force of the fuel pump 60, pressure between the merging portion 65 and the first check valve 63 in the first fuel supply path 671 is less than the pressure between the first check valve 63 and the first fuel tank 61, so that the first check valve 63 opens, and fuel is supplied from the first fuel tank 61 to the engine 3. Similarly, fuel is supplied from the second fuel tank 62 to the engine 3. However, when a large amount of fuel is stored in any one of the first fuel tank 61 and the second fuel tank 62, the pressure difference in the check valve on the side corresponding to this fuel tank becomes large, and the opening amount of that check valve becomes large. As a result, fuel is mainly sucked into the fuel pump 60 from the fuel tank having a larger amount of stored fuel. That is, the amount of fuel stored in the first fuel tank 61 and the second fuel tank 62 is brought into equilibrium by the fluid pressure differential between the fuel stored in the first fuel tank 61 and the fuel stored in the second fuel tank 62.

In a ceiling face of the first fuel tank 61 and the second fuel tank 62, a refueling portion 9 is formed that has a refueling port 91 configured to be closed with a fuel cap 90. Due to individual differences in the fuel cap 90 or the manner of fastening the fuel cap 90, along with supply of fuel to the engine 3, when a difference occurs between the internal pressures of the first fuel tank 61 and the second fuel tank 62, the fluid pressure of the fuel is affected, and so it is not possible to bring the amount of fuel stored into equilibrium using the fluid pressure differential of the fuel. Therefore, a communication channel 70 is provided whereby an upper space S1 of the first fuel tank 61 is in communication with an upper space S2 of the second fuel tank 62. One end of the communication channel 70 opens at a position adjacent to the refueling portion 9 of the first fuel tank 61, and the other end of the communication channel 70 opens at a position adjacent to the refueling portion 9 of the second fuel tank 62. Thus, the internal pressure of the first fuel tank 61 is kept substantially the same as the internal pressure of the second fuel tank 62.

In the example in FIG. 1, a diesel engine is adopted as the engine 3, so that the first fuel tank 61 and the second fuel tank 62 are connected to a fuel return port 68A of the engine 3 by a fuel return path 68 commonly configured with a fuel hose. The fuel return path 68 includes a common return path 680 that connects the fuel return port 68A of the engine 3 to a branching portion 66, a first fuel return path 681 that connects the branching portion 66 to a return port 68a of the first fuel tank 61, and a second fuel return path 682 that connects the branching portion 66 to a return port 68a of the second fuel tank 62. Note that the return port 68a formed within the first fuel tank 61 and the return port 68a formed within the second fuel tank 62 have approximately the same height level in each fuel tank. In order to have substantially the same fuel flow resistance in the first fuel return path 681 and the second fuel return path 682, the first fuel return path 681 and the second fuel return path 682 have substantially the same flow cross-sectional area and channel length. Accordingly, for example, when returning fuel flows into the first fuel tank 61 only, and so fuel reaches the return port 68a of the first fuel tank 61, the pressure of the first fuel return path 681 increases. Thus, in the branching portion 66, most fuel that has returned from the engine 3 flows into the second fuel tank 62.

Note that control of the above sort of return fuel can be more reliably performed by providing a float valve 69 that closes when the fluid level exceeds a fixed value in the return port 68a of the first fuel return path 681 and the return port 68a of the second fuel return path 682.

Example of Specific Configuration of Fuel Circulation

Figure 2:
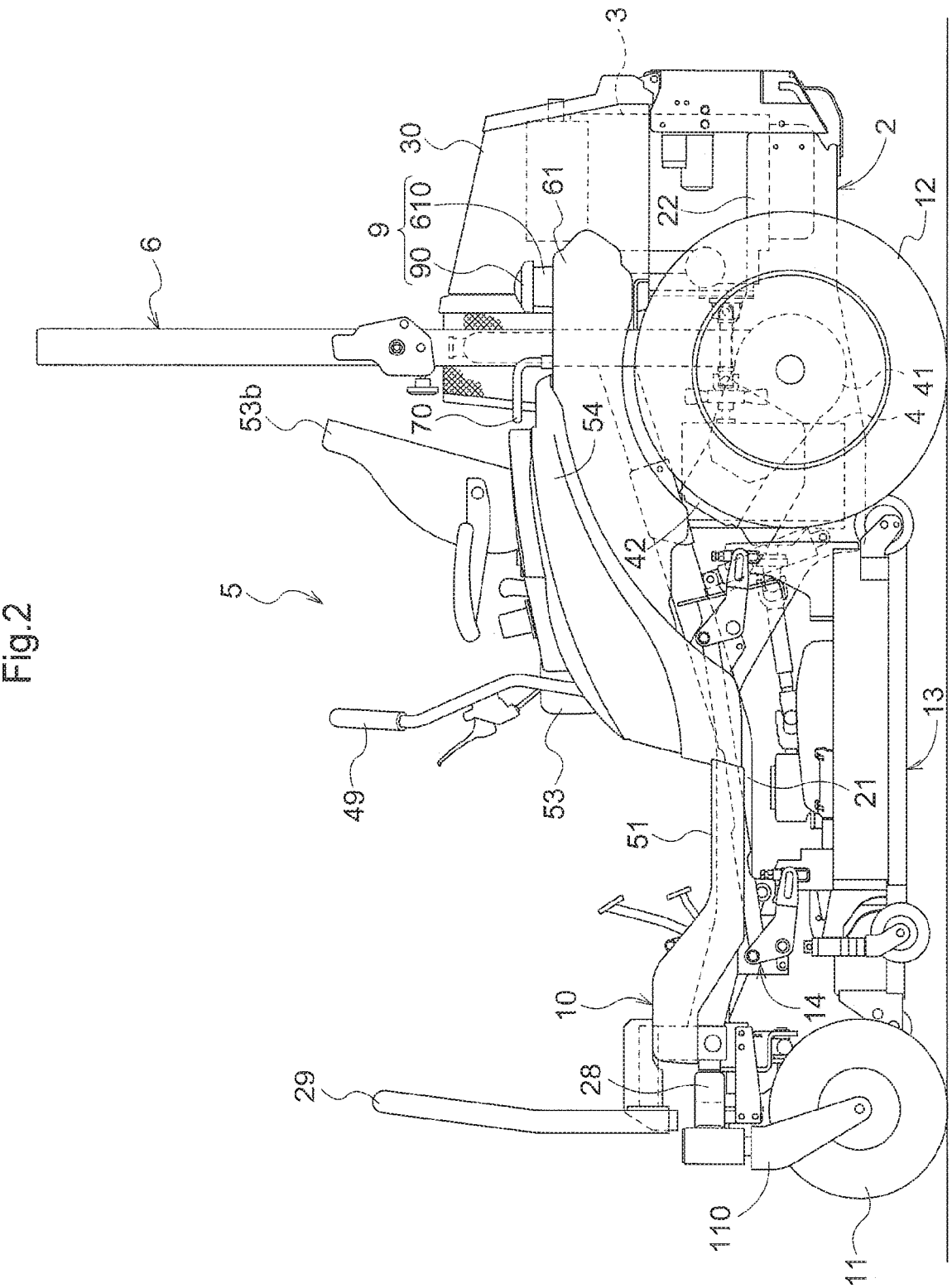
FIG. 2 is a side view of a zero-turn mower that is one specific embodiment of a work vehicle.
Figure 3:
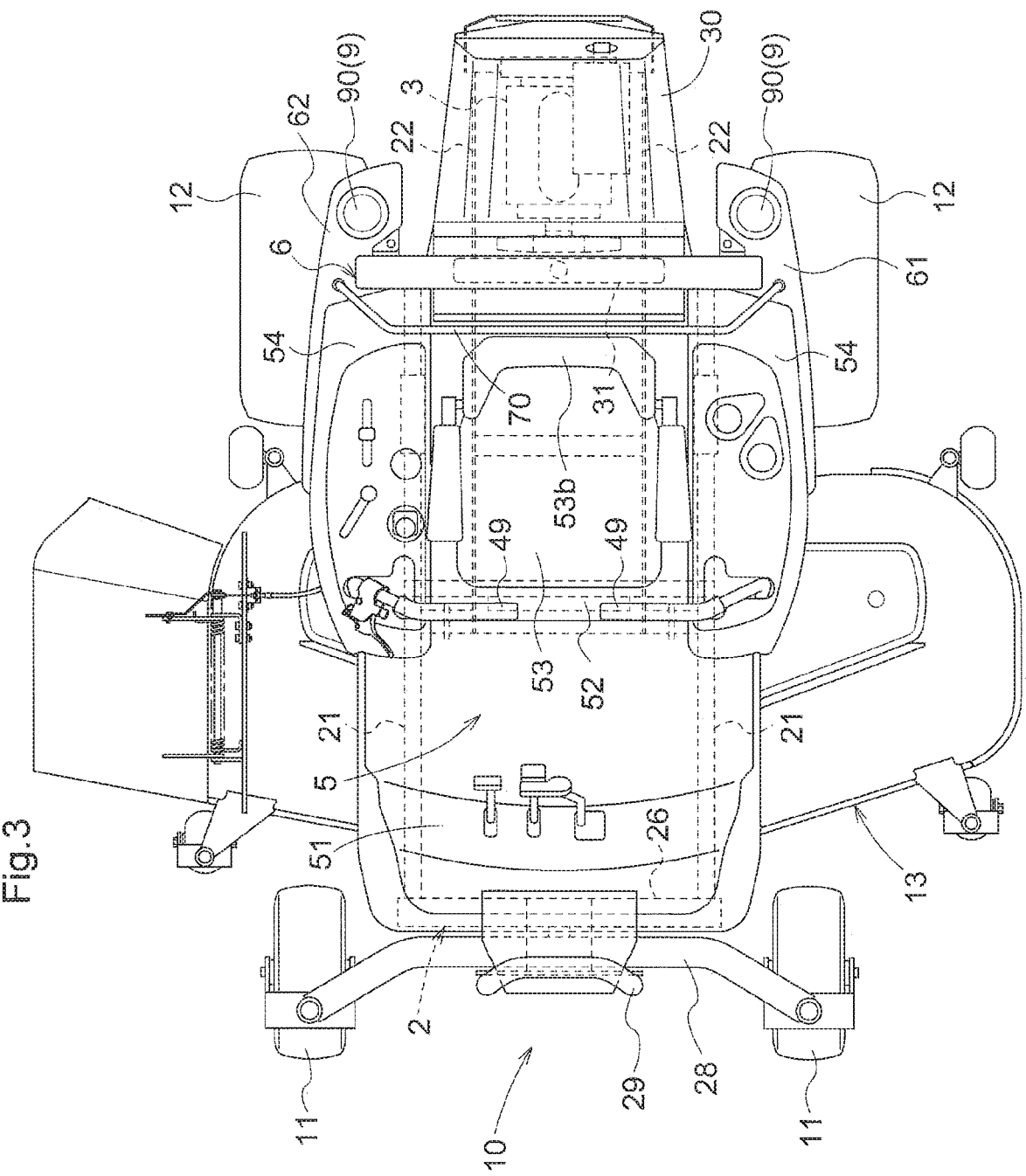
FIG. 3 is a plan view of the zero-turn mower.

Next is a description of one specific embodiment of a work vehicle according to the present invention, with reference to the drawings. This work vehicle is a riding mower in which a mower unit 13 is provided as a work apparatus. FIG. 2 is a side view of the riding mower, and FIG. 3 is a plan view. This riding mower is also referred to as a "zero-turn" mower which includes a vehicle body 10 supported on the ground by a left-right pair of front wheels 11, and by a left-right pair of rear wheels 12 serving as driving wheels configured to be independently rotational driven. The vehicle body 10 has a body frame 2 as a base member, and between the front wheels 11 and the rear wheels 12, the mower unit 13 is suspended from the body frame 2 through a linking mechanism 14. An operator portion 5 is disposed in an area in the center in the front-rear direction of the vehicle body 10. A ROPS (rollover protection structure) apparatus 6 is provided to the rear of the operator portion 5. The engine 3, which is a diesel engine in this embodiment, is disposed in an area at the rear end of the vehicle body 10. Engine auxiliary devices such as a radiator 31 are disposed in front of the engine 3, and the engine 3 and the engine auxiliary devices are covered by a hood 30 from above. In the area of the operator portion 5 of the vehicle body 10, a seat support body 52 is formed, and an operator seat 53 is provided on the upper face of the seat support body 52. Further, fenders 54 are formed on left and right side faces of the seat support body 52. A step 51 is laid out in front of the operator seat 53. Below the left side fender 54, the first fuel tank 61 is disposed following the circumferential face of the rear wheels 12, and below the right side fender 54, the second fuel tank 62 is disposed following the circumferential face of the rear wheels 12. The first fuel tank 61 and the second fuel tank 62 have substantially the same shape and dimensions, and extend past the ROPS apparatus 6 from the sides of the operator seat 53 in the front-rear direction of the vehicle body. The refueling portions 9 are provided, in the first fuel tank 61 and the second fuel tank 62, in upper face portions of the rear portions past the ROP apparatus 6. The refueling portion 9 includes a refueling pipe 610 protruding approximately perpendicularly from the upper face portion, and the fuel cap 90 covering the refueling port of the refueling pipe 610.

In the fuel system including the first fuel tank 61 and the second fuel tank 62, the basic configuration described with reference to FIG. 1 is adopted. The communication channel 70 whereby the first fuel tank 61 and the second fuel tank 62 are in communication is configured using a rubber hose enclosed with a metal pipe (for example, a steel pipe) as a communication tube, and is laid out between a seatback 53b of the operator seat 53 and a front wall of the hood 30.

A transmission 4 is disposed in front of the engine 3. The transmission 4 includes a left-right pair of rear axle transmission portions 41. Each of the left and right rear axle transmission portions 41 includes, as an example of a continuously variable transmission, a hydrostatic transmission (abbreviated to as "HST" hereinafter) 42 that can be independently operated. The HST 42 is able to change engine driving force from low speed to high speed in a continuously variable manner and transmit this driving force to the respective rear wheels 12, in a normal rotation (forward travel) state and a reverse rotation (rearward travel) state. Thus, straight forward travel is produced by driving both the left and right rear wheels 12 in the forward travel direction at the same or approximately the same speed, and straight rearward travel is produced by driving the left and right rear wheels 12 in the rearward travel direction at the same or approximately the same speed. Further, by causing the speeds of the left and right rear wheels 12 to differ from each other, it is possible to cause turning movement of the vehicle body 10 in an arbitrary direction. For example, by causing any one of the left and right rear wheels 12 to move at a low speed near zero speed, and operating the other of the rear wheels 12 at high speed on the side of forward travel or the side of rearward travel, it is possible to turn the vehicle body 10 within a small turning circle. Further, by driving the left and right rear wheels 12 in opposite directions from each other, it is possible to perform a spinning turn of the vehicle body 10 with approximately the center of the left and right rear wheels 12 as the center of the turn. The left-right pair of front wheels 11 are configured using caster wheels, and can freely change the direction in which they point around a vertical axis, so that the direction in which the front wheels 11 point is revised according to the direction of travel produced by driving of the left and right rear wheels 12.

A gearshift operation of the left and right HSTs 42 is performed using a left-right pair of gearshift levers 49 disposed on both sides of the operator seat 53. When a gearshift lever 49 is kept at a forward-rearward neutral position, the continuously variable transmission is set to a neutral stoppage state. A forward travel gearshift is realized by operating the gearshift lever 49 forward from the neutral position, and a rearward travel gearshift is realized by operating the gearshift lever 49 rearward.

As is apparent from FIG. 3, the body frame 2 includes a left-right pair of front frames 21 and a left-right pair of rear frames 22, and the left and right front frames 21 are interconnected by a front cross-beam unit 26 including a plurality of cross-beams. Likewise, the left and right rear frames 22 are interconnected by a rear cross-beam unit including a plurality of cross-beams, although the rear cross-beam unit is not shown clearly. An engine mounting area is formed in an area at the rear end of the rear frames 22.

In the front cross-beam unit 26 positioned at the front end of the vehicle body 10, a front-wheel support arm 28 extending in the transverse direction of the vehicle body is provided. A reverse U-shaped front guard 29 is provided standing in the center of the front-wheel support arm 28. The front wheels 11 are attached through caster brackets 110 at both ends of the front-wheel support arm 28.

Figure 4:
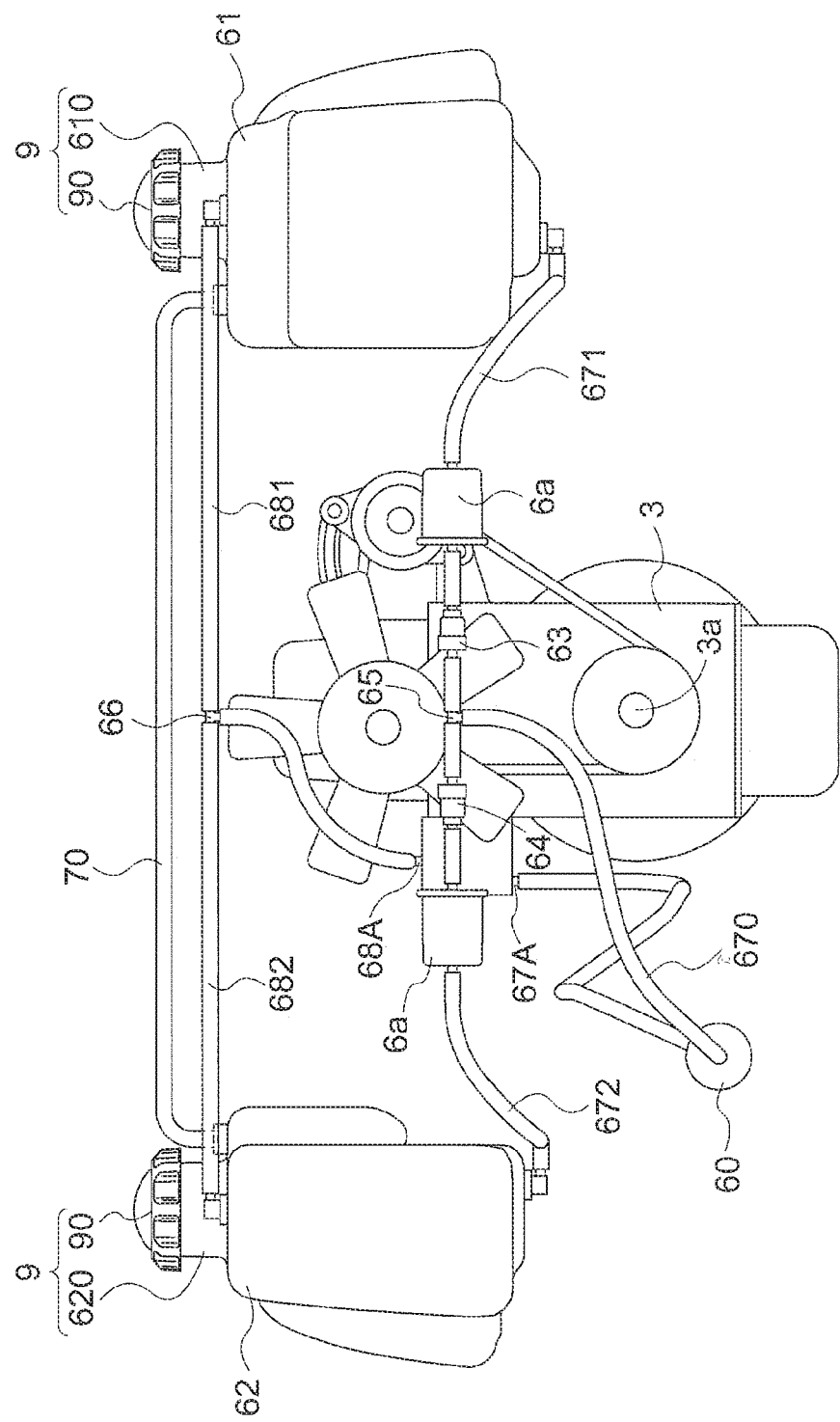
FIG. 4 is a front view schematically showing fuel circulation between a first fuel tank, a second fuel tank, and an engine.

FIG. 4 shows the fuel circulation system of this mower. The principles described with reference to FIG. 1 are also employed in the fuel circulation of this mower. Regarding structure features of this fuel circulation system, the bottom face of the first fuel tank 61 and the bottom face of the second fuel tank 62 are positioned higher than a crankshaft 3a of the engine 3, the first fuel supply path 671 is connected at the bottom face of the first fuel tank 61, and the second fuel supply path 672 is connected at the bottom face of the second fuel tank 62. Also, the first fuel tank 61 and the second fuel tank 62 are in communication through the communication channel 70. Further, the first fuel return path 681 is connected at the upper face of the first fuel tank 61, and the second fuel return path 682 is connected at the upper face of the second fuel tank 62. Also, a filter 6a is provided intervening between the first fuel tank 61 and the first check valve 63, and a filter 6a is provided intervening between the second fuel tank 62 and the second check valve 64.

As described above, the upper space S1 of the first fuel tank 61 and the upper space S2 of the second fuel tank 62 are in communication with the communication channel 70; and a main portion of communication channel 70 extends substantially horizontally, so that the internal pressures of the respective tanks are brought into equilibrium. However, in consideration of failsafe redundancy, the fuel cap 90 may employ a structure for keeping the tank internal pressure at atmospheric pressure. For example thereof, there may be provided, between the fuel cap 90 and the refueling pipe 610, a filtering film that allows air to pass therethrough but does not allow fuel to pass therethrough. Whereby, the internal pressures of the first fuel tank 61 and the second fuel tank 62 may be constantly kept at atmospheric pressure.

Other Embodiments of the First Embodiment (1) In the above-described embodiment, the engine 3 is disposed in the rear portion of the vehicle body 10, but a configuration may also be adopted in which the engine 3 is disposed in the front portion of the vehicle body 10, and the transmission 4 is disposed to the rear of the engine 3.

(2) In the above-described embodiment, a mid-mount configuration is adopted in which the mower unit 13 is disposed between the front wheels 11 and the rear wheels 12, but a front-mount configuration may also be adopted in which the mower unit 13 is disposed in front of the front wheels 11.

(3) In the above-described embodiment, the front wheels 11 are configured using caster wheels, but the front wheels 11 may also be configured using steered wheels that can be operated using a steering wheel. In this case, outputs from the same transmission that can be branched by a differential mechanism are received by the left and right rear wheels 12 through the differential mechanism.

(4) In the above-described embodiment, a work vehicle in which the mower unit 13 is installed as a work apparatus, i.e. a riding mower, was described. Instead, it is possible to install a spraying apparatus, a snow removal apparatus, a planting apparatus, a harvesting apparatus, or the like as the work apparatus.

Second Embodiment

Overall Configuration of the Mower

In this embodiment, a mid-mount riding mower is described as a mower that is one example of a work vehicle.

Figure 5:
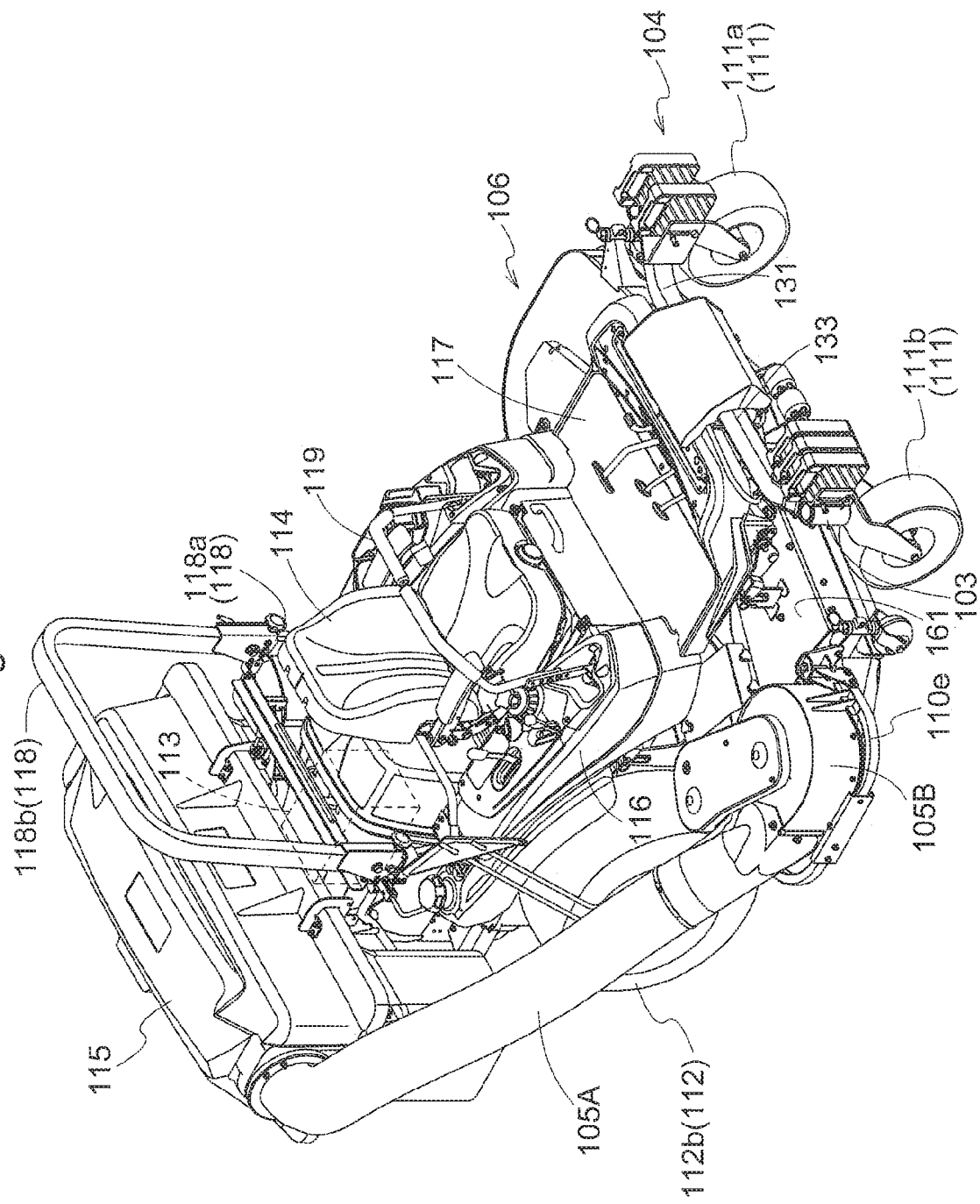
FIG. 5 shows a second embodiment (same through to FIG. 15), and is a perspective view of a mower.
Figure 6:
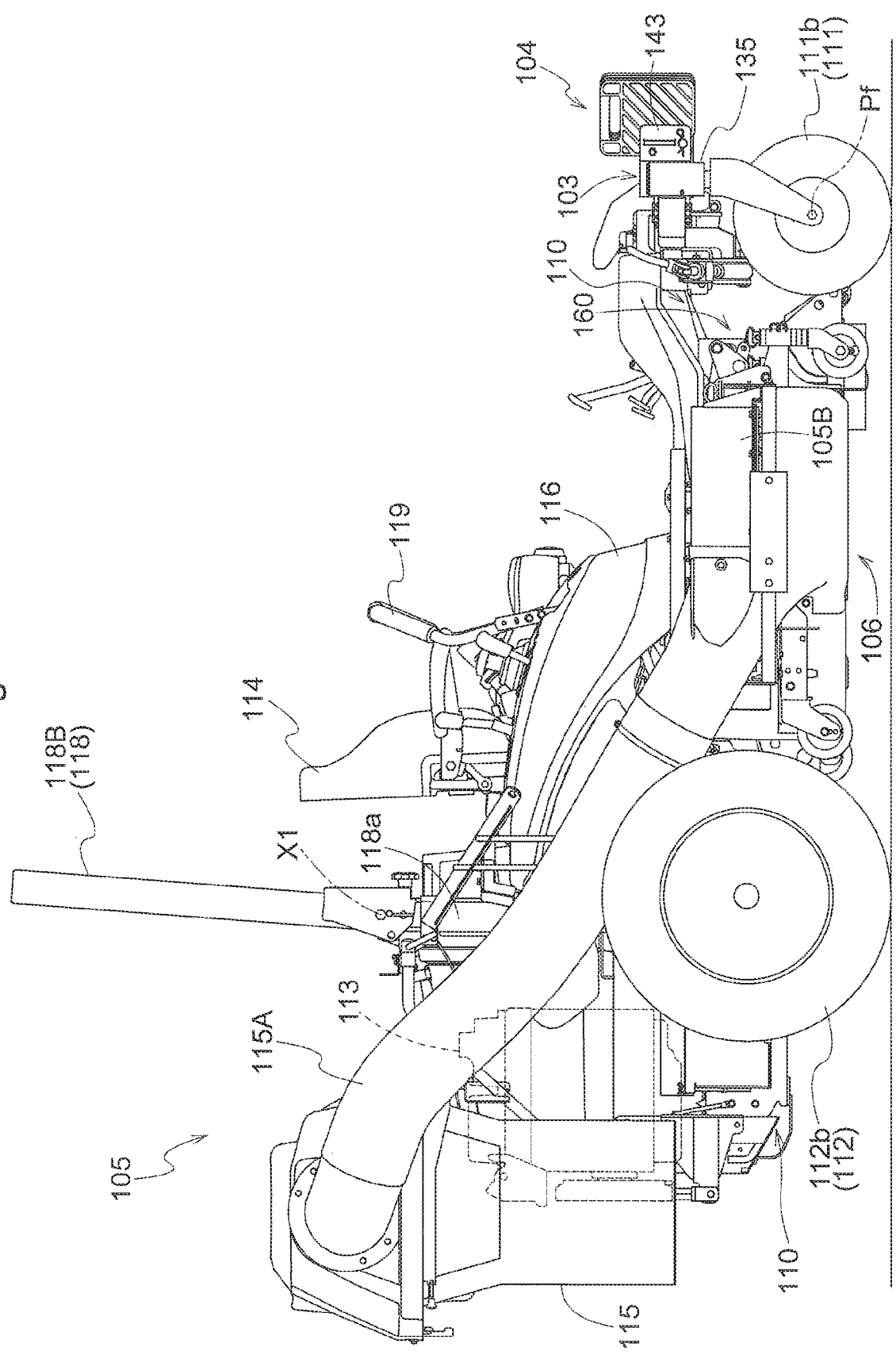
FIG. 6 is a side view of the mower.
Figure 7:
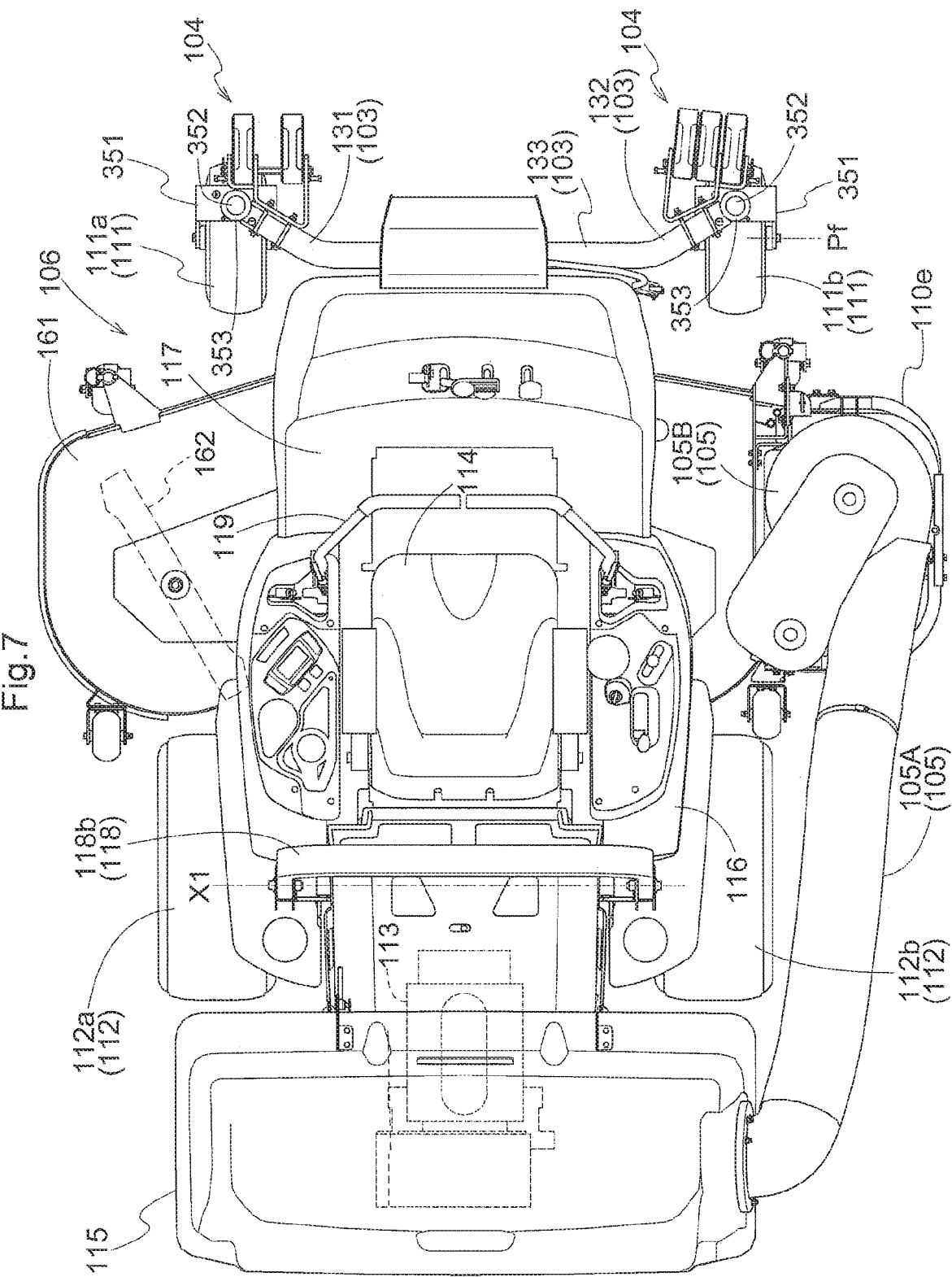
FIG. 7 is a plan view of the mower.
Figure 8:
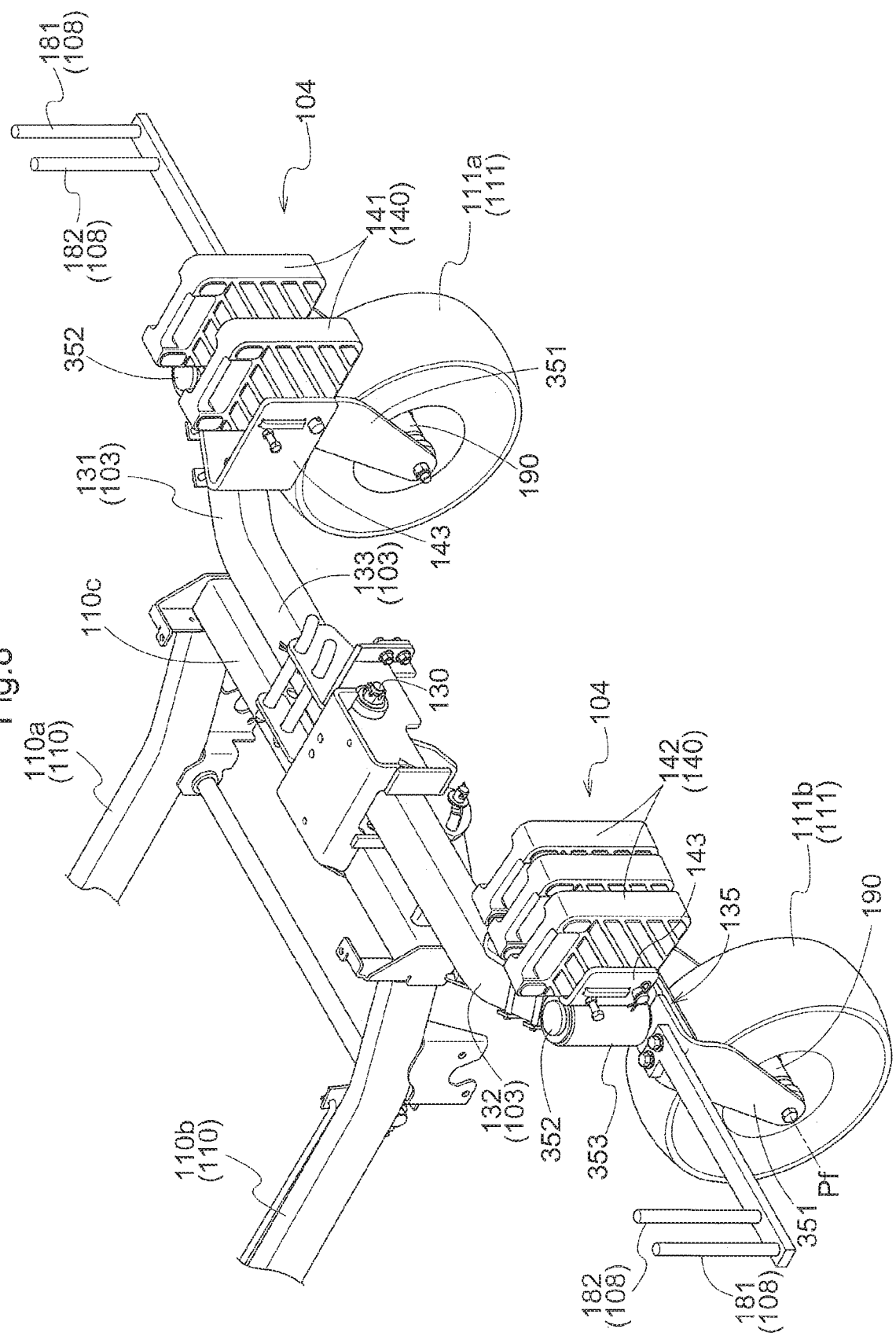
FIG. 8 is a perspective view showing a body frame and a front-wheel support arm.

FIG. 5 is a perspective view of the mower, FIG. 6 is a side view, FIG. 7 is a plan view, and FIG. 8 is a perspective view that schematically shows the front wheels area of the vehicle.

As shown in FIG. 8, the body frame 110 of the mower traveling vehicle includes a left frame 110a and a right frame 110b that extend in the front-rear direction of the vehicle and are connected to each other by a cross-beam. In the front area of the body frame 110, a left front wheel 111a and a right front wheel 111b that are freely-turning caster-type wheels are provided; and in the center area of the body frame 110, a left rear wheel 112a and a right rear wheel 112b that are drive wheels are provided. When it is not particularly necessary to distinguish between the left front wheel 111a and the right front wheel 111b, these wheels 111a, 111b will be collectively referred to as 'front wheels 111'. Likewise, when it is not particularly necessary to distinguish between the left rear wheel 112a and the right rear wheel 112b, these wheels 112a, 112b will be collectively referred to as 'rear wheels 112'.

Between the front wheels 111 and the rear wheels 112, a mower unit 106 is suspended and supported such that the mower unit 106 can be raised/lowered. At the rear end of the body frame 110, a grass collection container 115 that collects mown grass from the mower unit 106 is removably attached.

As shown in FIGS. 5 and 6, an operator seat 114 is disposed above the center portion of the body frame 110, and an engine 113 is installed rearward of the operator seat 114. A step 117 positioned at the base of the operator seat 114 is laid out on the upper face of the left frame 110a, and fenders 116 are attached to the left and right of the operator seat 114.

Between the operator seat 114 and the grass collection container 115, a gate-shaped ROPS (rollover protection structure) 118 is fixed standing in a vertically-oriented posture. The ROPS 118 is configured with a left-right pair of base end portions 118a that pass through the fender 116 and protrude upward, and a gate-shaped frame portion 118b provided capable of folding rearward around support points X1 at the upper end of the left-right pair of base end portions 118a.

The left rear wheel 112a and the right rear wheel 112b are driven independently from each other by engine driving force whose speed is modified by hydrostatic continuously variable transmissions that are not shown. By separately performing swinging operation of a left-right pair of operation levers 119 disposed so as to be capable of front-rear swinging operation on both left and right arms of the operator seat 114, the left rear wheel 112a and the right rear wheel 112b can each be independently driven for frontward or rearward travel with continuously variable speed.

The mower unit 106 is suspended and supported from the body frame 110 through a quad-linked linking mechanism 160. In the mower unit 106, within a mower deck 161 that forms an internal space relative to the grass mowing plane, three rotating blades 162 that can be driven around a vertical shaft are disposed in a triangular shape when viewed from a plan view, such that the center rotating blade 162 is offset slightly forward. Due to the wind produced by the rotating blades 162, mown grass is gathered at a side end area of the mower deck 161. A mown grass transport apparatus 105 that transports grass mown by the mower unit 106 from the mower unit 106 to the grass collection container 115 is disposed beside the body frame 110. A transport duct 105A and a blower 105B are provided in the mower unit 106.

Counterweight Attachable to Front Wheels Support Arm

With reference to FIG. 8, the relationship between the body frame 110 and the front wheels 111 will be described next. A rolling shaft 130 extending in the front-rear direction of the vehicle is provided in approximately the center of a front cross-beam 110c of the body frame 110, and a front-wheel support arm 103 is swingably connected to the rolling shaft 130. The front-wheel support arm 103 is made of angular pipe, and by a bending process, a straight portion 133, and a left bent portion 131 and a right bent portion 132 positioned on opposite sides of the straight portion 133, are formed. The left bent portion 131 is bent so as to point forward and outside from the left side of the straight portion 133. The right bent portion 132 is bent so as to point forward and outside from the right side of the straight portion 133. Thus, the front-wheel support arm 103 is bow-shaped as a whole, and free end areas of the left bent portion 131 and the right bent portion 132 are positioned forward of the straight portion 133 in the front-rear direction of the vehicle body.

A front wheel support unit 135 is attached at the free end each of the left bent portion 131 and the free end of the right bent portion 132. To have the front-wheel support arm 103 support the front wheels 111 in a caster configuration, the front-wheel support arm 103 has U-shaped fork brackets 351 as caster brackets, turning shafts 352 provided standing from the upper face of fork brackets 351, and cylindrical bodies 353 that bear the turning shafts 352. A front axle 190 having a front wheel axle Pf extends at a lower end portion of each fork bracket 351, so that the front wheels 111 are rotatably attached to the front axles 190.

According to the type of grass collection container 115 to be connected, particularly according to the weight of the grass collection container 115, a counterweight 104 that balances the weight of the grass collection container 115 can be attached to the front wheel support unit 135. The counterweight 104 includes a weight bracket 143, and a weight element 140 that can be attached to a plurality of attachment portions 144 provided in the weight bracket 143. In this embodiment, as counterweights, a left counterweight 141 is disposed in the left bent portion 131, and a right counterweight 142 is disposed in the right bent portion 132. The left counterweight 141 includes a left weight bracket 143A attachable to the left bent portion 131 as the weight bracket 143, and the right counterweight 142 includes a right weight bracket 143B attachable to the right bent portion 132 as the weight bracket 143. The weight brackets 143 are positioned above the front wheels 111 and forward of the front wheel axles Pf, and as a result, the weight elements 140 attachable to the weight brackets 143 also are positioned above the front wheels 111 and forward of the front wheel axles Pf.

Figure 9:
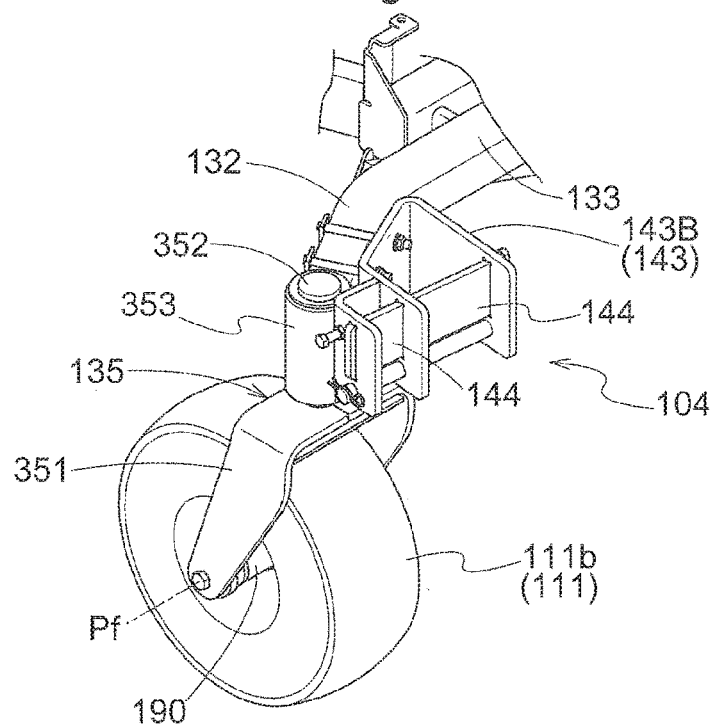
FIG. 9 is a perspective view showing a weight bracket with a weight element not attached.
Figure 10:
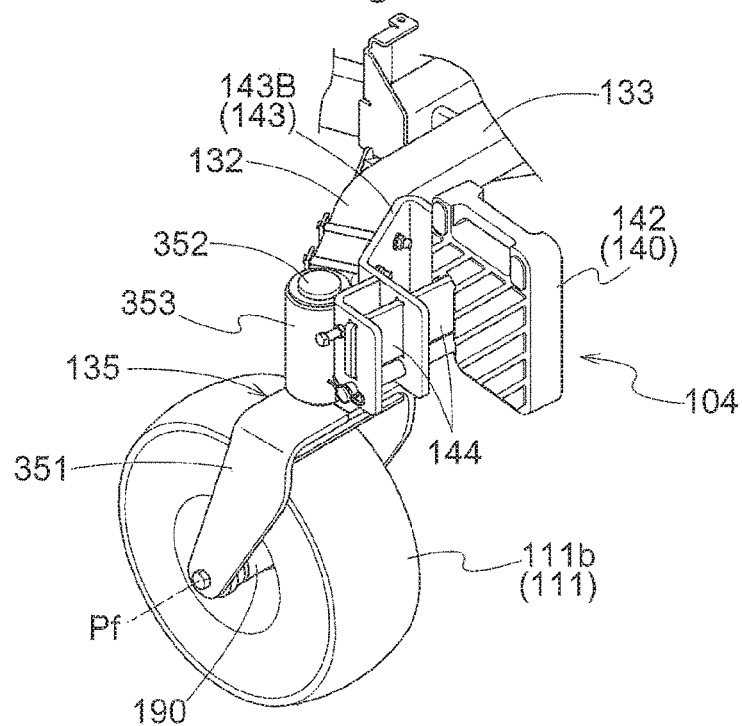
FIG. 10 is a perspective view showing a state in which a weight element is attached to the weight bracket.

As shown in FIG. 9, in the weight bracket 143, three attachment portions 144 are provided lined up laterally in the transverse direction of the vehicle. By selecting attachment of a weight element 140 to each attachment portion 144, it is possible to select the weight of the counterweight 104. FIG. 10 shows the weight bracket 143 having one weight element 140 attached, FIG. 11 shows the weight bracket 143 having two weight elements 140 attached, and FIG. 12 shows the weight bracket 143 having three weight elements 140 attached.

Figure 13:
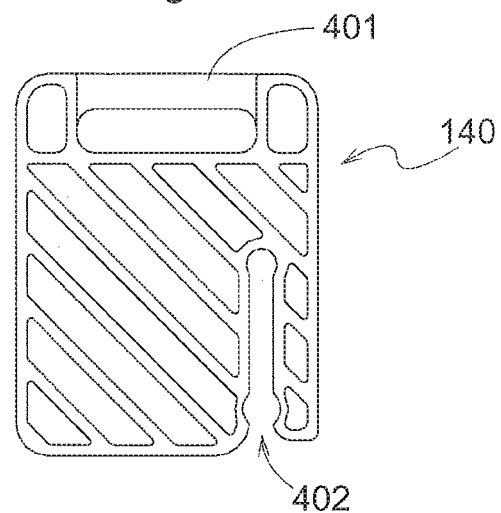
FIG. 13 is a front view of a weight element.

As shown in FIG. 13, the weight element 140 is an approximately rectangular body with a thin amount of thickness, with a handle 401 formed in an upper portion, and a slit 402 formed upward from the lower face. By inserting a guide plate and a fixing pin provided in the weight bracket 143 into this slit 402, the weight element 140 can be fixed to the weight bracket 143.

As schematically shown in FIG. 8, corner pole units 108 that serve as guides for an operator sitting in the operator seat 114 to check the width (outer end position) of the mower unit 106 in the transverse direction of the vehicle and the width of mowing (grass mowing border position) by the mower unit 106 are provided in the area of both ends of the front-wheel support arm 103. Outer end position poles 181 and mowing border position poles 182 are provided standing in the corner pole units 108.

Other Configurations

Figure 14:
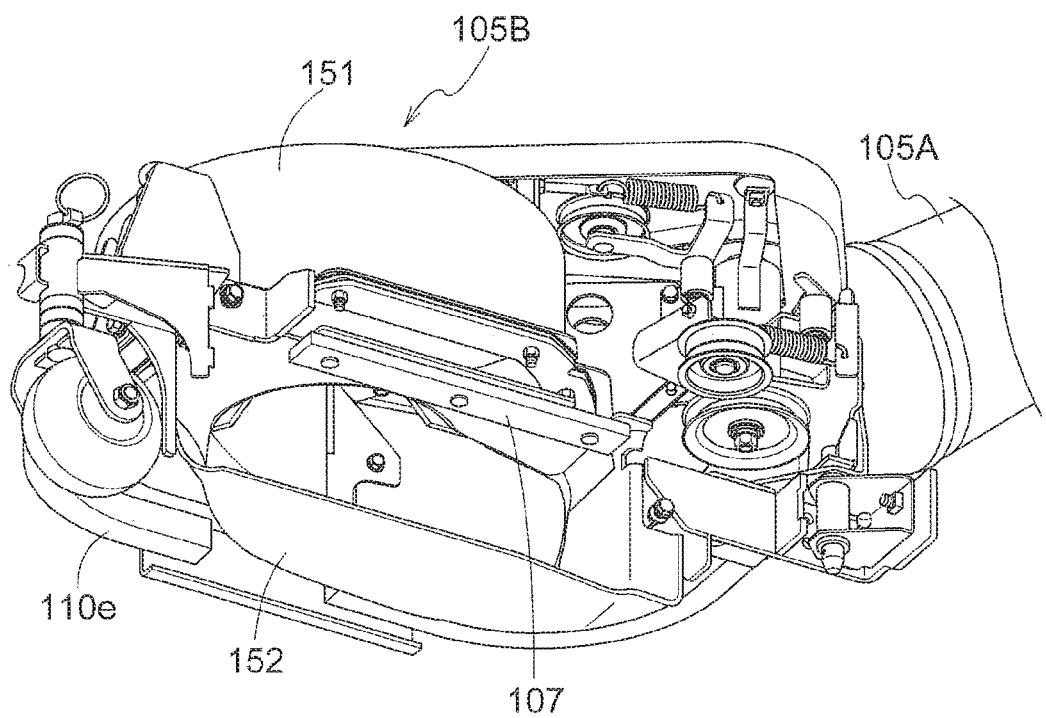
FIG. 14 is a perspective view of a blower.

As shown in FIG. 5, the blower 105B is attached to the right side end of the mower deck 161 through the U-shaped blower support frame 110e. In the blower 105B, an intake port is connected to the internal space of the mower deck 161, and an exit port is connected to a front end port of the transport duct 105A. The connection structure of the blower 105B to the mower deck 161 is shown in FIG. 14 in a perspective view viewed from diagonally below. In FIG. 14, the mower deck 161 is omitted in order to more easily see the connection structure of the blower 105B to the mower deck 161.

Figure 15:
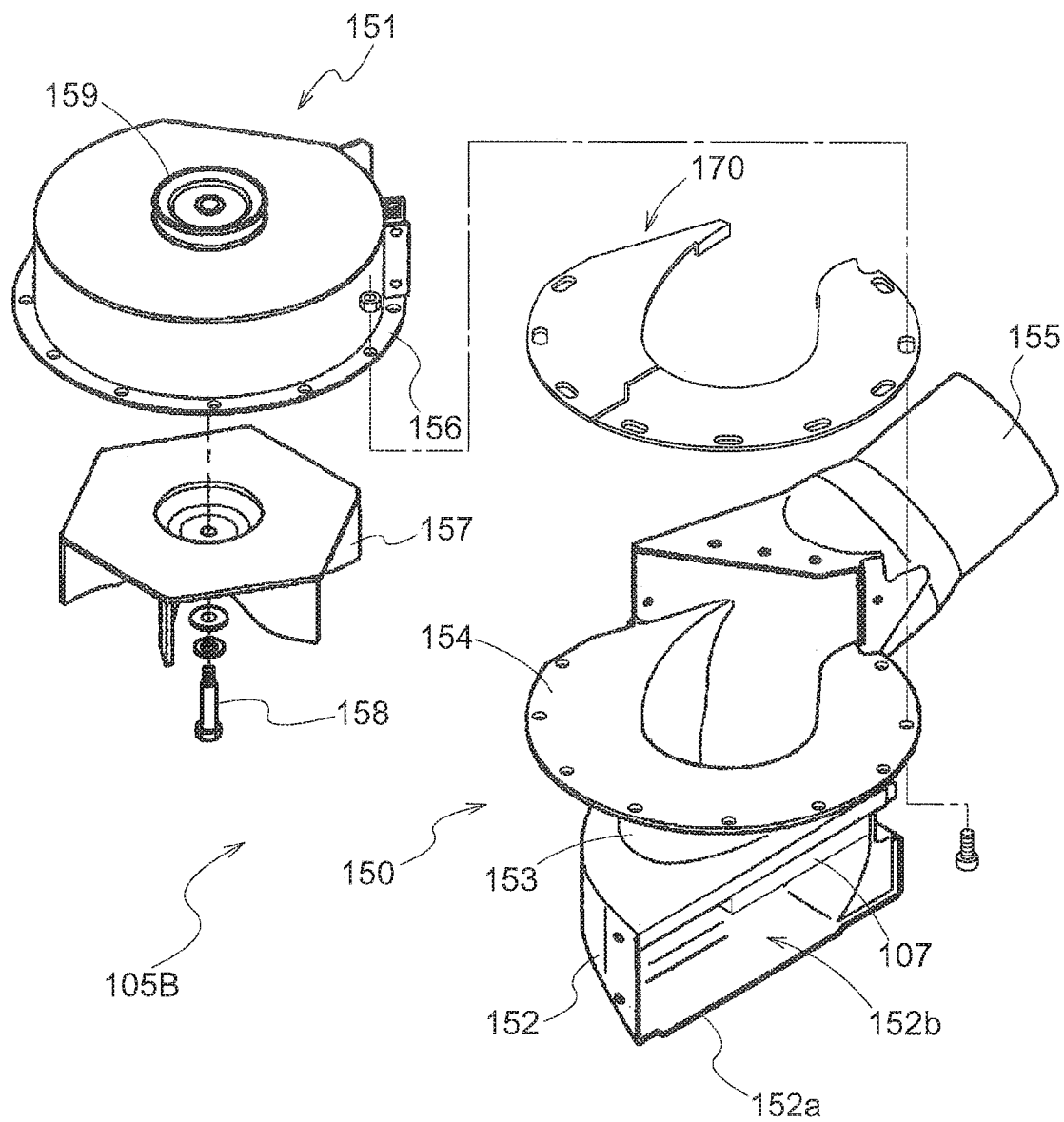
FIG. 15 is an exploded perspective view of the blower.

As shown in FIG. 15, the blower 105B includes a blower main body 150 made of resin, and an upper case 151 made of metal. The blower main body 150 includes a lower case 152 connectable to the right side face of the mower deck 161, a first connection portion 153 that extends upward from the upper face of that lower case 152, a flat plate portion 154 that protrudes outward in the radial direction from the upper end of the first connection portion 153, and a cylindrical second connection portion 155 that is connectable to the first connection portion 153 and the flat plate portion 154 and extends rearward. A wear prevention plate 170 made of metal in two sections is provided on the upper face of the flat plate portion 154.

A flange portion 156 that protrudes to the outside in the radial direction is formed at the lower end of the upper case 151. Using this flange portion 156, the upper case 151 can be attached to the flat plate portion 154 with the wear prevention plate 170 sandwiched therebetween. A fan 157 is disposed within the upper case 151. In the center of the upper case 151, a rotating shaft 158 to which the fan 157 is fixed is provided in the vertical direction. The upper end of the rotating shaft 158 protrudes from the upper face of the upper case 151, and a pulley 159 can be fixed to this protruding upper end. Power from a belt transmission mechanism provided in the upper face of the mower deck 161 is branched at the pulley 159.

In a side end portion 152a of the lower case 152, an opening 152b is formed that accepts a side end portion 152a of the mower deck 161 in order to connect to the mower deck 161. In order to absorb assembly errors and displacement between the blower 105B and the mower deck 161, a gap is formed between the upper edge of the side end portion 152a and the upper face of the ceiling wall of the mower deck 161. In order to fill this gap, a flat plate-like rubber mat 107 is fastened with rivets at the lower face of the upper edge of the side end portion 152a. The thickness of the rubber mat 107 is slightly less than or approximately the same as the gap, so that mown grass is prevented from being blown out from that gap. In a case where there is severe displacement in the vertical direction of the blower 105B or the mower deck 161, so that the rubber mat 107 is touched, that displacement is absorbed by elasticity of the rubber mat 107.

Other Embodiments of the Second Embodiment (1) In the above-described embodiment, the front-wheel support arm 103 that supports the front wheels 111 is capable of rolling, but the front-wheel support arm 103 may also be fixed to the body frame 110.

(2) In the above-described embodiment, the front wheels 111 are caster-type free wheels, but the front wheels 111 may also be drive wheels.

(3) The shapes of the weight bracket 143 and the weight element 140 are not limited to those specified in the above-described embodiment. Also, the attachment position of the weight bracket 143 or the quantity of the attachment portions 144, in other words the quantity of weight elements 140 that are attachable, also may be changed according to specifications of the mower.

Third Embodiment

This embodiment will be described with reference to a riding electric zero-turn mower (referred to below as simply a mower) that is one example of a work vehicle.

Overall Configuration of the Mower

Figure 16:
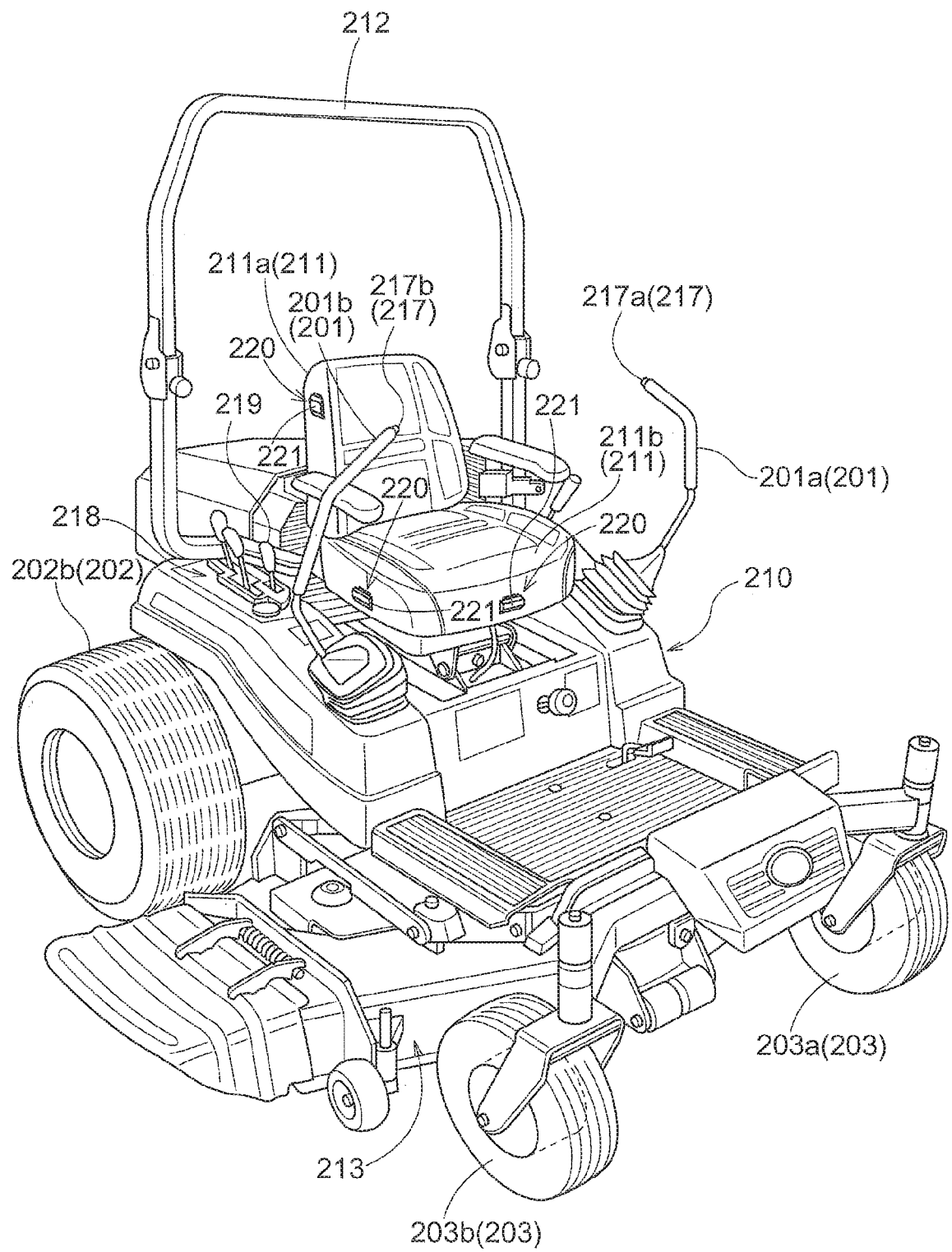
FIG. 16 shows a third embodiment (same through to FIG. 18), and is a perspective view showing the overall configuration of a zero-turn mower that is one example of a work vehicle.

FIG. 16 is a perspective view showing the overall configuration of the mower. As shown in FIG. 16, the mower includes a vehicle body 210 supportable by caster wheel units 203 that are front wheels and drive wheel units 202 that are rear wheels, an operator seat 211 disposed in the vehicle body 210, a rollover protection frame 212 provided standing to the rear of the operator seat 211, and a mower unit 213 suspended from the vehicle body 210 so as to be capable of raising/lowering through a raising/lowering linking mechanism in a space below the vehicle body 210 between the caster wheel units 203 and the drive wheel units 202.

On both sides of the operator seat 211, operation units 201 are disposed that include a left operation lever 201a and a right operation lever 201b that swing around a horizontal swinging axis in the lateral direction of the vehicle body. Further, on one side of the operator seat 211, in this case the right side, an electrical operation panel 218 is provided that has switch buttons, switch levers, and the like of an electrical control system. As manual operation tools for the caster wheel units 203, there are provided a left steering switch 217a that commands left steering angle steering of left and right caster wheels 203a and 203b, a right steering switch 217b that commands right steering angle steering of the left and right caster wheels 203a and 203b, and a caster wheel drive lever 219 that commands rotational driving (rotational driving for travel) of the left and right caster wheels 203a and 203b. The left steering switch 217a is attached to the tip of the left operation lever 201a, and the right steering switch 217b is attached to the tip of the right operation lever 201b. The caster wheel drive lever 219 is disposed in the vicinity of the electric operation panel 218.

When working, the operator sits in the operator seat 211, and performs intended grass mowing work by operating the operation unit 201 provided on both sides of the operator seat 211, the electrical operation panel 218, the caster wheel drive lever 219, and the like.

Operator Seat

Figure 17:
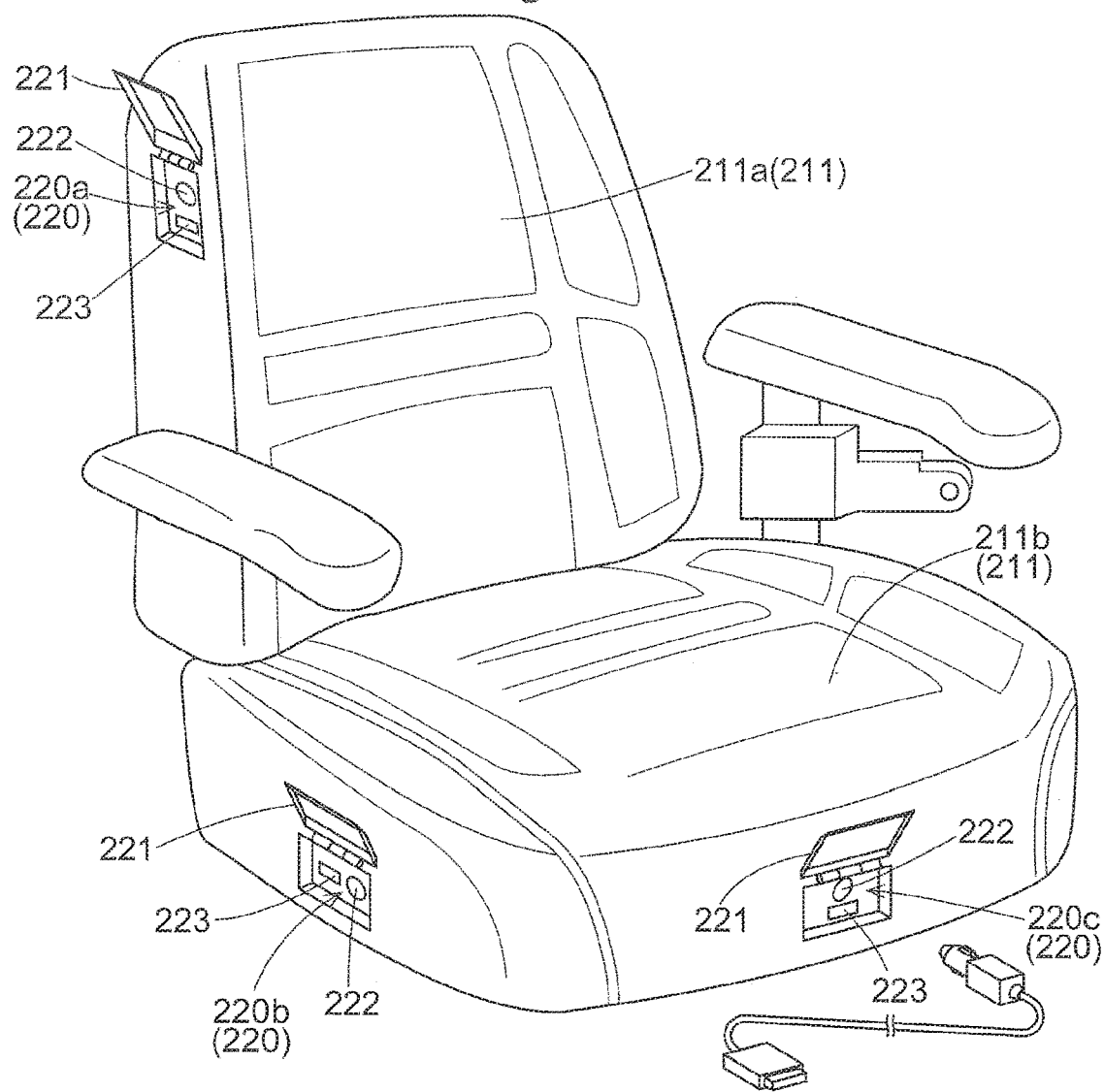
FIG. 17 is a perspective view showing the vicinity of an operator seat.

Also, as shown in FIGS. 16 and 17, the operator seat 211 includes a backrest portion 211a and a seat portion 211b.

In the operator seat 211, there is provided an electrical connection port 220 that externally outputs electrical power and an electrical signal. Specifically, an electrical connection port 220a is provided in a thick portion of a side portion of the backrest portion 211a. Also, electrical connection ports 220b and 220c are respectively provided in a thick portion of a side portion of the seat portion 211b. More specifically, the electrical connection port 220a is provided in a thick portion of a right side portion of the backrest portion 211a, the electrical connection port 220b is provided in a thick portion of a right side portion of the seat portion 211b, and the electrical connection port 220c is provided in a thick portion of a front side portion of the seat portion 211c.

Electrical Connection Port

Following is a description of the electrical connection port 220.

As shown in FIG. 17, the electrical connection port 220 is provided within a recessed portion formed in the operator seat 211. The electrical connection port 220 comprises at least one of an AUX port where it is possible to connect an external device to input, listen to, or record audio; a cigar socket used as a socket-type electrical supply apparatus; and a USB port used as a connection port for insertion of a USB cable.

In the present embodiment, a cigar socket 222 and a USB port 223 are provided in the respective electrical connection ports 220 (220a, 220b, 220c).

Cover

Figure 18:
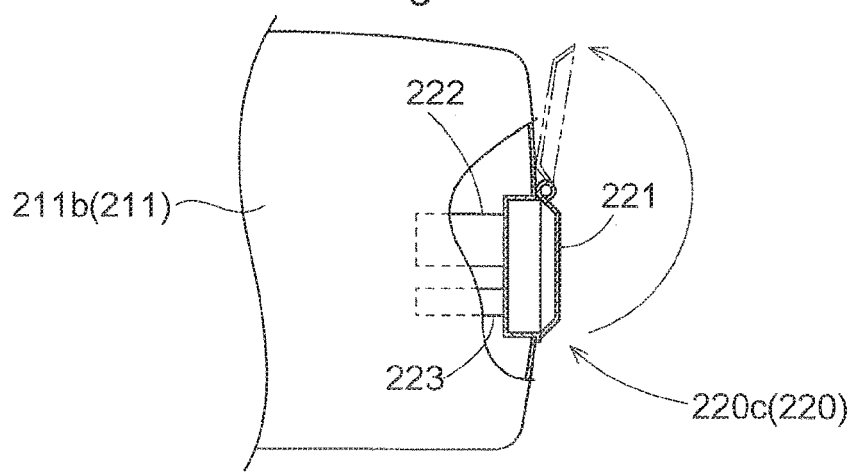
FIG. 18 is an enlarged side view showing states in which a cover is open/closed.

Also, as shown in FIGS. 17 and 18, covers 221 are provided for covering the respective electrical connection ports 220 (220a, 220b, 220c). The cover 221 is supported so as to be capable of swinging around the lateral axis along the upper edge of the electrical connection port 220. By swinging vertically around the lateral axis, the attitude is changed between an open state and a closed state. In this case, it is possible to anticipate an effect that it will be difficult for rainwater or the like to penetrate into the electrical connection port 220.

Also, a seal member (not shown) for preventing water penetration is provided between the electrical connection port 220 and the cover 221. Note that the seal member may be provided in the electrical connection port 220, or may be provided in the cover 221. Also, the seam member may be provided in both the electrical connection port 220 and the cover 221.

Other Embodiment 1 of the Third Embodiment

In the above embodiment, three electrical connection ports 220 are provided in the operator seat 211, but this is not a limitation, two or less or four or more may be provided, and as necessary, the quantity of electrical connection ports 220 can be freely set.

Other Embodiment 2 of the Third Embodiment

In the above embodiment, the electrical connection port 220a is provided in a thick portion in a side portion of the backrest portion 211a, but this is not a limitation, and the electrical connection port 220a may be provided in any location in the operator seat 211.

Other Embodiment 3 of the Third Embodiment

In the above embodiment, the electrical connection ports 220b and 220c are provided in a thick portion in a side portion of the seat portion 211b, but this is not a limitation, and the electrical connection ports 220b and 220c may be provided in any location in the operator seat 211.

Other Embodiment 4 of the Third Embodiment

In the above embodiment, the cigar socket 222 and the USB port 223 are provided in the electrical connection port 220, but this is not a limitation, and at least any one among an AUX port configured for audio input/output, a cigar socket configured for charging, and a USB port configured for insertion of a USB cable can be provided in the electrical connection port 220. Note that the electrical connection port 220 can externally output at least any of electrical power and an electrical signal.

Other Embodiment 5 of the Third Embodiment

In the above embodiment, the cover 221 that covers the electrical connection port 220 is provided, but this is not a limitation, and the cover 221 does not need to be provided.

Other Embodiment 6 of the Third Embodiment

In the above embodiment, the cover 221 is provided so as to be capable of swinging around the lateral axis along the upper edge of the electrical connection port 220, but this is not a limitation, and the cover 221 may be provided so as to be capable of swinging around the lateral axis along the lower edge, or may be provided so as to be capable of swinging around the vertical axis along a left or right side edge. Also, the cover 221 may be provided so as to be detachable.

Other Embodiment 7 of the Third Embodiment

In the above embodiment, a zero-turn mower is given as an example of a work vehicle, but this is not a limitation, and the embodiment is also applicable in other mowers generally, and is also applicable in tractors or the like.

Other Embodiment 8 of the Third Embodiment

In the above embodiment, an electric mower is given as an example, but this is not a limitation, and the embodiment is also applicable in work vehicles driven by an engine, or in hybrid work vehicles.

Also, the present invention can be utilized not only in zero-turn mowers, but also in mowers generally or in tractors.

What is claimed is:

1. A mower comprising:
a body frame;
a mower unit installed to the body frame;
a grass collection container optionally installed at a rear portion of the body frame;
a front-wheel support arm provided at a front portion of the body frame;
a left front wheel and a right front wheel supported by the front-wheel support arm;
a counterweight; and
a weight bracket provided on the front-wheel support arm and configured to attach the counterweight thereto;
wherein the counterweight includes a plurality of weight elements,
the weight bracket includes a plurality of attachment portions, and
at least one weight element can be attached to each attachment portion.

2. The mower according to claim 1, wherein the front-wheel support arm is in a shape of a bow having a left bent portion bent forward in a left end area of the front-wheel support arm, and a right bent portion bent forward in a right end area of the front-wheel support arm,
the left front wheel is attached to a tip portion of the left bent portion,
the right front wheel is attached to a tip portion of the right bent portion, and
the weight bracket is fixed to each of the left bent portion and the right bent portion.

3. The mower according to claim 2, wherein the left front wheel is attached to the tip portion of the left bent portion through a caster bracket associated therewith for turning around a vertical axis thereof, and
the right front wheel is attached to the tip portion of the right bent portion through a caster bracket associated therewith for turning around a vertical axis thereof.

4. The mower according to claim 1, wherein by providing the plurality of attachment portions in the weight bracket in a line in a transverse direction of the vehicle, the plurality of weight elements can be attached to the weight bracket in the line in the transverse direction of the vehicle.

5. The mower according to claim 1, wherein the weight element attached to the weight bracket is positioned above the left front wheel or the right front wheel, and forward of an axle passing through the front wheel associated therewith.

6. The mower according to claim 1, wherein a rolling shaft extends through the body frame in a front-rear direction of the vehicle, and
  the front-wheel support arm is connected to a front end of the body frame by the rolling shaft to be rolled around the rolling shaft relative to the body frame.

7. The mower according to claim 1, further comprising corner pole units for checking a width of the mower unit and/or a width of mowing by the mower unit, the corner poles being provided in an area of opposite ends of the front-wheel support arm.

* * * * *